US011144253B2

(12) United States Patent
Terafuji

(10) Patent No.: US 11,144,253 B2
(45) Date of Patent: Oct. 12, 2021

(54) SPLIT PRINTING ON A PRINTING MEDIUM

(71) Applicant: BROTHER KOGYO KABUSHIKI KAISHA, Nagoya (JP)

(72) Inventor: Ryo Terafuji, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 42 days.

(21) Appl. No.: 16/807,922

(22) Filed: Mar. 3, 2020

(65) Prior Publication Data

US 2020/0285425 A1 Sep. 10, 2020

(30) Foreign Application Priority Data

Mar. 4, 2019 (JP) ............................. JP2019-038331

(51) Int. Cl.
*G06F 3/12* (2006.01)

(52) U.S. Cl.
CPC .......... *G06F 3/1204* (2013.01); *G06F 3/1208* (2013.01); *G06F 3/1254* (2013.01); *G06F 3/1256* (2013.01)

(58) Field of Classification Search
None
See application file for complete search history.

(56) References Cited

U.S. PATENT DOCUMENTS

| | | | | |
|---|---|---|---|---|
| 5,551,785 A | 9/1996 | Mori et al. | | |
| 2012/0236368 A1* | 9/2012 | Uchida | G06K 9/80 | 358/3.28 |
| 2013/0222857 A1* | 8/2013 | Nobushima | G06F 3/1208 | 358/1.18 |
| 2017/0015120 A1* | 1/2017 | Campanini | B41J 11/46 | |

FOREIGN PATENT DOCUMENTS

| | | | |
|---|---|---|---|
| JP | H08-52908 A | 2/1996 | |
| WO | WO 2020/251327 A1 * | 12/2020 | B41J 3/4075 |

* cited by examiner

*Primary Examiner* — Eric A. Rust
(74) *Attorney, Agent, or Firm* — Kenealy Vaidya LLP

(57) ABSTRACT

There is provided a non-transitory computer readable medium that causes a computer to: obtain a width of the printing medium; save image data including a first two-dimensional code in a memory; divide the image data into a plurality of pieces of first divided image data corresponding to the width of the printing medium; determine whether the first two-dimensional code is divided into a plurality of two-dimensional codes; in a case that it is determined that the first two-dimensional code is divided into the plurality of two-dimensional codes, increase an error correction level of the plurality of divided two-dimensional codes; and sequentially output the plurality of pieces of first divided image data to the printing apparatus.

6 Claims, 19 Drawing Sheets

HORIZONTAL SHIFT ARRANGEMENT

SPLIT LABEL x 2

HORIZONTAL SHIFT ARRANGEMENT

VERTICAL SHIFT ARRANGEMENT
(OVERLAP)

VERTICAL SHIFT ARRANGEMENT
(SEPARATION)

SPLIT LABEL x 2

HORIZONTAL SHIFT ARRANGEMENT

SPLIT LABEL x 3

HORIZONTAL SHIFT ARRANGEMENT

SPLIT PRINTING ON A PRINTING MEDIUM

CROSS REFERENCE TO RELATED APPLICATION

The present application claims priority from Japanese Patent Application No. 2019-038331 filed on Mar. 4, 2019, the disclosure of which is incorporated herein by reference in its entirety.

BACKGROUND

Field of the Invention

The present disclosure relates to a non-transitory computer readable medium storing an image data processing program executed on an operation terminal connected to a printing apparatus.

Description of the Related Art

There is conventionally known a technique in which a tape is effectively used by performing split printing in which printing is performed by dividing the tape into a plurality of tapes having a width that does not correspond to a desired character size for printing, and arranging the tapes parallel to each other.

SUMMARY

In recent years, there are many cases where printing image data including a two-dimensional code, such as a QR code (registered trademark), is printed on a tape to produce a printing label. In this case, when split printing is performed like the above related art, the printing image data is also required to be divided to correspond to the tape width. In this situation, the two-dimensional code included in the printing image data may also be divided.

In this case, when a user arranges the tapes, for which printing has been performed, so that the tapes are adjacent to each other, a slight shift between the tapes may occur. This may inhibit a bar code scanner from reading the two-dimensional code appropriately, which may reduce user-friendliness.

An object of the present disclosure is to provide an image data processing program capable of generating image data that can maintain the reading accuracy of a two-dimensional code in split printing, and a non-transitory computer readable medium recording the image data processing program.

According to an aspect of the present disclosure, there is provided a non-transitory computer readable medium storing an image data processing program. The image data processing program is executed by a computer connected to a printer that includes: a conveyer configured to convey a printing medium; and a printing unit configured to perform printing corresponding to input image data on the printing medium conveyed by the conveyer. The image data processing program causes the computer to: obtain a width of the printing medium; obtain a piece of image data that is a printing target and that includes a first two-dimensional code generated by a first error correction level, and save the piece of image data in a memory of the computer; divide the piece of image data saved into a plurality of pieces of first divided image data corresponding to the width of the printing medium obtained; determine whether the first two-dimensional code included in the piece of image data is divided into a plurality of two-dimensional codes; in a case that it is determined that the first two-dimensional code is divided into the plurality of two-dimensional codes, increase an error correction level of the plurality of divided two-dimensional codes included in the plurality of pieces of first divided image data to a second error correction level higher than the first error correction level; and sequentially output the plurality of pieces of first divided image data to the printing apparatus.

The printing apparatus of the present disclosure can perform so-called split printing. Namely, in the computer in which the image data processing program of the present disclosure is executed, the image data that is the printing target is saved in the memory, and then the saved image data is divided into the plurality of pieces of first divided image data corresponding to the width of the printing medium conveyed by the conveyer of the printing apparatus. The certain number of printing matters in which the plurality of pieces of divided image data are printed on the printing medium are produced by sequentially outputting the plurality of pieces of first divided image data to the printing apparatus. The entirety of the image data is shown by allowing a user to arrange the printing matters in the order of production so that the printing matters are adjacent to each other.

In the split printing executed by such an aspect, the two-dimensional code may be included, for example, in the above image data. When the plurality of printing matters are produced as described above, the two-dimensional code may be divided into a plurality of dimensional codes. In this case, a slight shift may be caused when the user arranges the certain number of printing matters so that they are adjacent to each other. In such a case, the two-dimensional code may not be read well by the barcode scanner.

In view of the above, in the present disclosure, when the two-dimensional code (first two-dimensional code) is included in the image data saved in the memory, it is determined whether the first two-dimensional code in the image data is divided into the plurality of two-dimensional codes. When the first two-dimensional code in the image data is divided into the plurality of two-dimensional codes, the error correction level of the divided two-dimensional codes is increased to the second error correction level higher than the error correction level (first error correction level) of the original first two-dimensional code. In other words, the first two-dimensional code is changed into the divided two-dimensional codes having the second error correction level. Then, the certain pieces of first divided image data including the plurality of divided two-dimensional codes having the higher error correction level are sequentially output to the printing apparatus.

The reading failure as described above is inhibited and an information obtaining rate for the two-dimensional code is improved by increasing the error correction level of the two-dimensional codes (may be referred to as divided two-dimensional codes) generated by being divided into the plurality of codes in split printing, to a high value. This improves user-friendliness.

According to the present disclosure, it is possible to generate the image data that can maintain the reading accuracy of the two-dimensional code in split printing.

BRIEF DESCRIPTION OF THE DRAWINGS

FIGS. 7A to 7C depict shift arrangements of the split labels, wherein FIG. 7A depicts a horizontal shift arrangement, FIG. 7B depicts a vertical shift arrangement in which the labels overlap with each other, and FIG. 7C depicts another vertical shift arrangement in which the labels are separated from each other.

DESCRIPTION OF THE EMBODIMENTS

Referring the drawings, an embodiment of the present disclosure is explained below. In the following, a front, rear, left, right, up, and down of a label producing apparatus 1 correspond to directions appropriately indicated by arrows in the respective figures, such as FIG. 1.

<Schematic Structure of Label Producing Apparatus>

Figure 1:
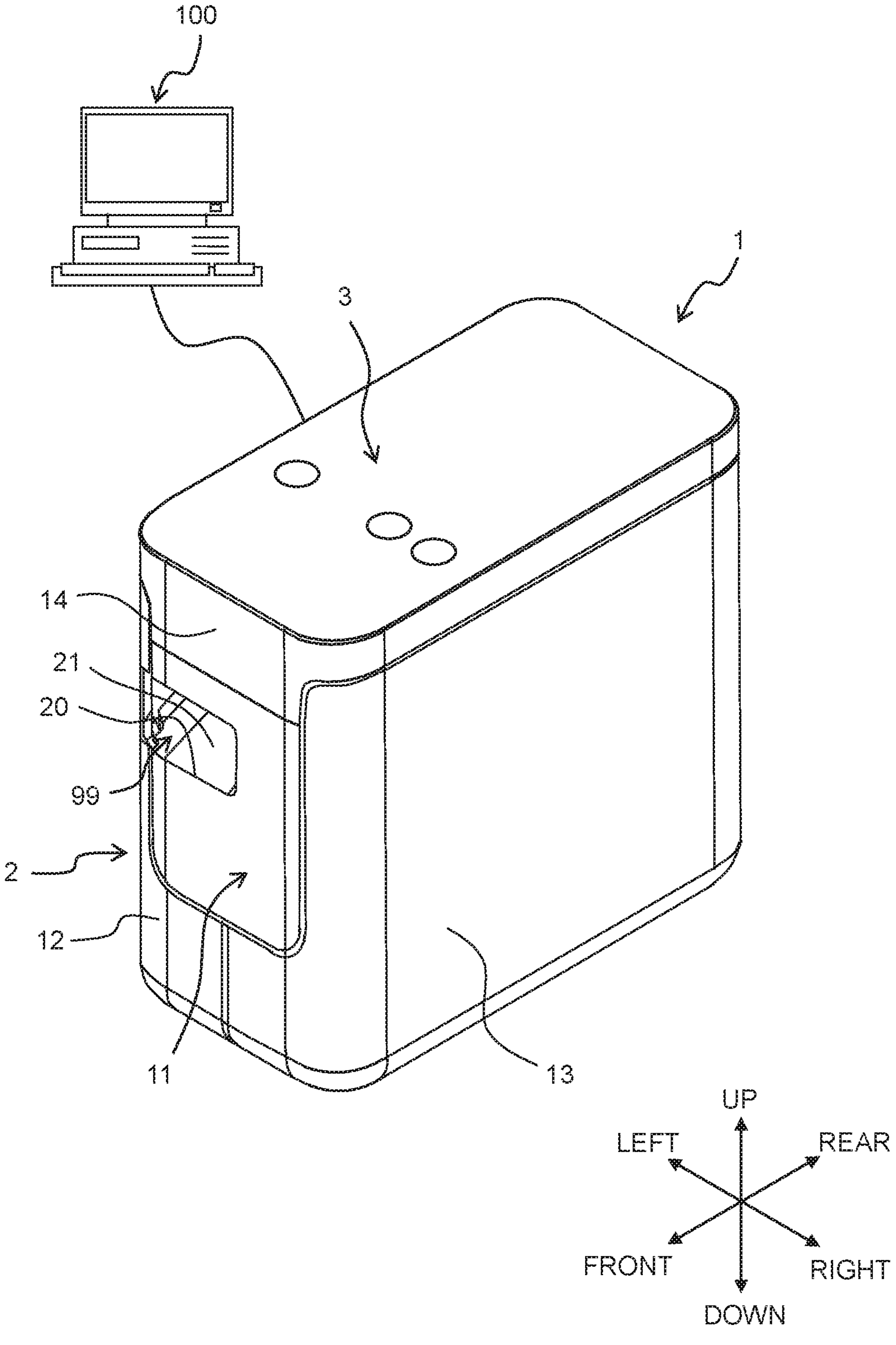
FIG. 1 depicts an operation terminal and an appearance of a label producing apparatus applied to an image data processing program.

The label producing apparatus 1 depicted in FIG. 1 is a general purpose apparatus that is capable of producing a printing label (printing matter) by use of a tape cartridge. In this embodiment, a printing apparatus in a receptor type is explained.

As depicted in FIG. 1, the label producing apparatus 1 (printing apparatus) includes a main body 11 having a substantially rectangular parallelepiped shape and covered with a main body cover 2. The main body cover 2 has a left cover 12, a right cover 13, and an upper cover 14. The main body cover 2 covers a left portion, a right portion, and an upper portion of the main body 11. The left cover 12 is attached to a left lower portion of the main body 11 to pivot around an axis extending in a front-rear direction. The left cover 12 is provided so that a cartridge holder 8 (see FIG. 2 described below) provided at a left side-surface portion of the main body 11 can be opened and closed. The right cover 13 is removably installed to a right side-surface portion of the main body 11. The right cover 13 can open and close a battery accommodating portion (not depicted) provided at a right portion of the main body 11.

An upper surface of the upper cover 14 is provided with an operation unit 3 through which the label producing apparatus 1 is operated. The operation unit 3 includes, for example, buttons such as a power button and a cutter button, through which a variety of operations are performed. A front portion of the main body 11 is provided with a discharge portion 99 having an inclined surface 21 connected to a label discharge opening 20. The printing label (not depicted) produced by the label producing apparatus 1 passes the discharge portion 99 toward the discharge opening 20, and is discharged from the label producing apparatus 1 to the outside through the discharge opening 20. A Universal Serial Bus (USB) port and the like is disposed at a rear surface portion of the main body 11. The label producing apparatus 1 is connected to an operation terminal 100 (see FIGS. 4A and 4B described below) via a USB cable 107 (see FIGS. 4A and 4B described below) connected to the USB port. The label producing apparatus 1 performs desired printing on a printing tape 57 (printing medium, see FIGS. 2 and 3 described below) based on image data including characters, numbers, figures and the like and transmitted from the operation terminal 100. The label producing apparatus 1 may be wired-connected to the operation terminal 100 via any other cable than the USB cable. The label producing apparatus 1 may be connected to the operation terminal 100 wirelessly.

<Internal Structure of Apparatus>

Figure 2:
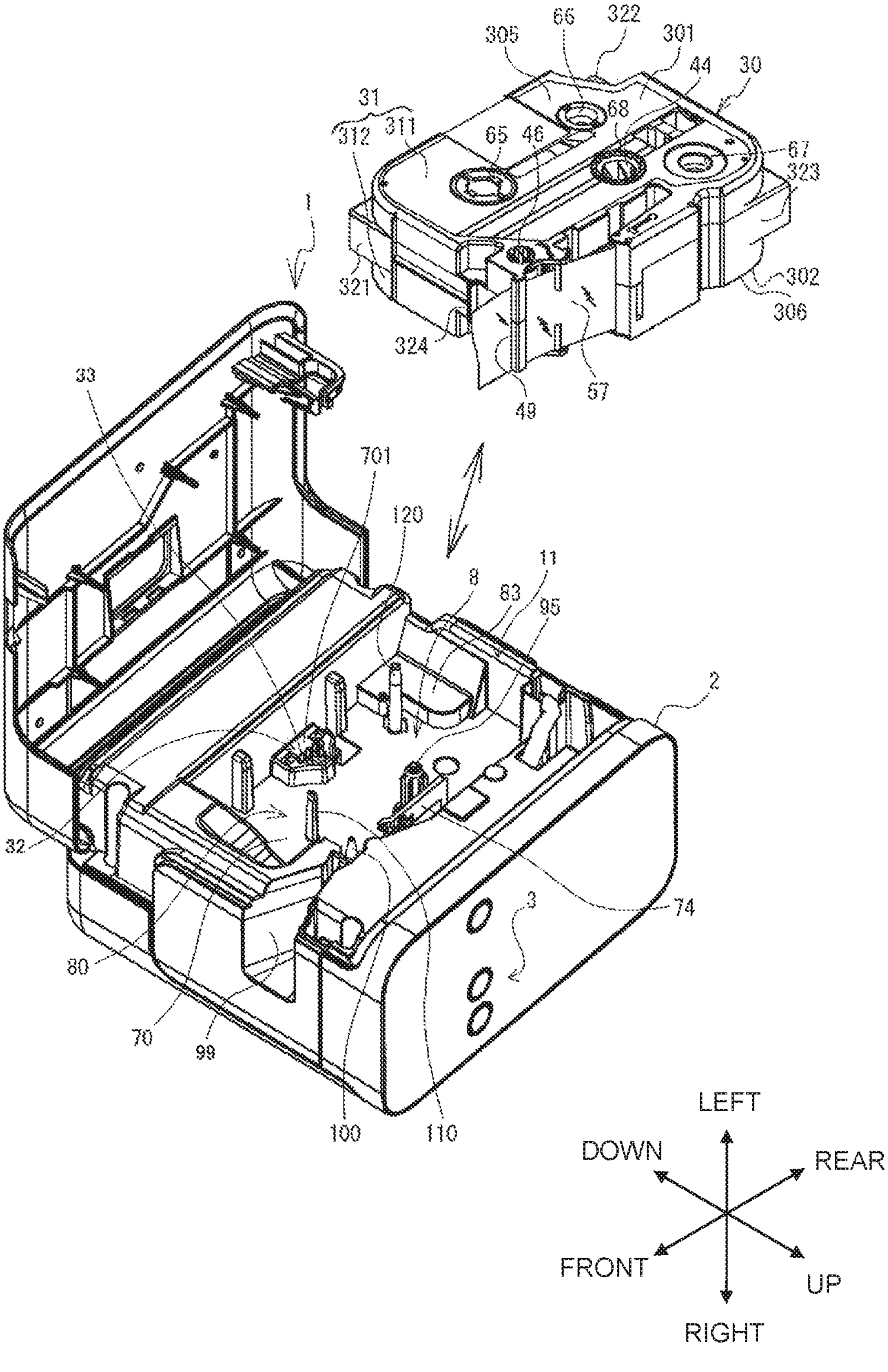
FIG. 2 is a perspective view of the label producing apparatus and a tape cartridge.
Figure 3:
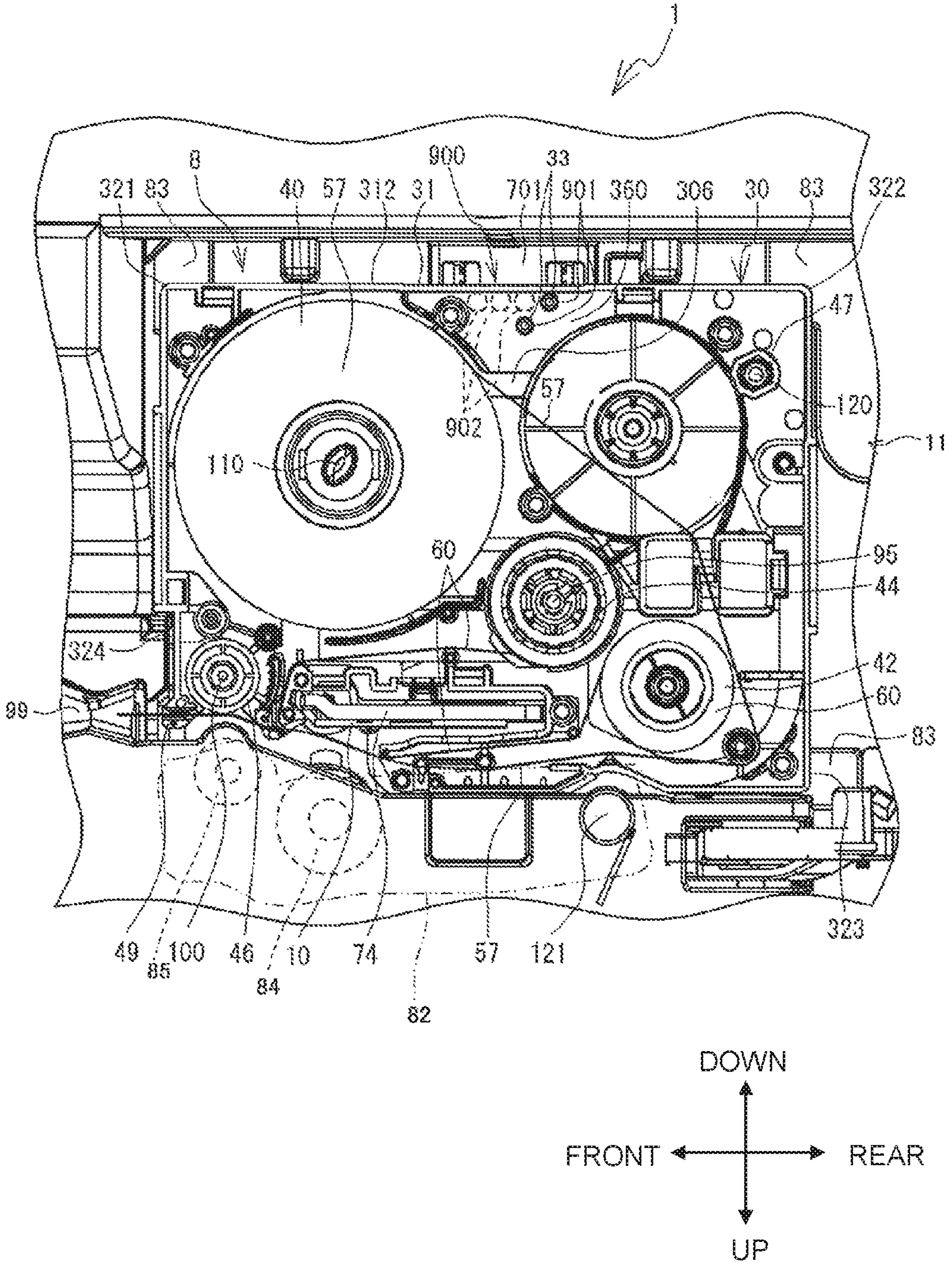
FIG. 3 is a plan view depicting a vicinity of a cartridge holder in which the tape cartridge of the label producing apparatus is installed.

An internal structure of the label producing apparatus 1 is explained. As depicted in FIGS. 2 and 3, the cartridge holder 8, in which the tape cartridge 30 is removably installed, is provided at the left side-surface portion of the main body 11. The cartridge holder 8 includes a cavity 80, corner support surfaces 83, a recess 70, and a lower support surface 701. The cavity 80 is a recess that is recessed so as to correspond to a shape of a bottom surface 302 of a cassette case 31. The corner support surfaces 83 are provided at a lower rear portion, a lower front portion, and an upper rear portion of the cartridge holder 8. The lower support surface 701 is provided at a center portion in the front-rear direction of a lower portion of the cartridge holder 8. The corner support surface 83 and the lower support surface 701 are flat surfaces extending horizontally from an outer edge of the cavity 80.

When the tape cartridge 30 is installed in the cartridge holder 8, the corner support surfaces 83 support lower surfaces of corner portions of the tape cartridge 30, and the lower support surface 701 supports a lower recessed wall 360 (see FIG. 3) of the tape cartridge 30.

A head holder 74 is erected in the cartridge holder 8 at a position that is a substantially center portion in the front-rear direction and is close to the upper side. The head holder 74 is made from a plate-like member extending in the front-rear direction. A thermal head 10 (printing unit) including a heating element (not depicted) is provided on an upper side surface of the head holder 74. A ribbon winding shaft 95 is erected on a rear side of the head holder 74. The ribbon winding shaft 95 can be installed in and removed from a ribbon winding roller 44 of the tape cartridge 30. A tape driving shaft 100 is erected at a front side of the head holder 74. The tape driving shaft 100 can be installed in and removed from the conveyance roller 46 of the tape cartridge 30. An auxiliary shaft 110 is erected on a lower rear side of the tape driving shaft 100. The auxiliary shaft 110 can be installed in and removed from a printing tape roll 40 of the tape cartridge 30. A guide shaft 120 is erected at a position close to a corner at a lower rear side of the cartridge holder 8. The guide shaft 120 can be installed in and removed from a guide hole 47 of the tape cartridge 30.

A driving motor 63 (see FIGS. 4A and 4B described below), which is a stepper motor, is disposed on a right side of the cartridge holder 8 of the main body 11. The ribbon winding roller 44 (ribbon winding shaft 95), the conveyance roller 46 (tape driving shaft 100), and a platen roller 84 described below are connected to the driving motor 63 via gears (not depicted). Driving the drive motor 63 rotates the ribbon winding roller 44, the conveyance roller 46, and the platen roller 84.

A cartridge sensor 32 is provided on the lower support surface 701 positioned at the substantially center portion in the front-rear direction of the lower portion of the cartridge holder 8. A plurality of push sensor protrusions 33 (five protrusions in this example) are provided in the cartridge sensor 32. When the tape cartridge 30 is installed in the cartridge holder 8, a detection target 900 of the tape cartridge 30 faces the sensor protrusions 33. This causes the detection target 900 to selectively push the sensor protrusions 33, which correspond to a combination of a tape color of the printing tape 57 and an ink color of an ink ribbon 60 depending on a type of the tape cartridge 30. The cartridge sensor 32 outputs a detection signal indicating type information (tape width, tape color, and ink color) of the tape cartridge 30 based on a on/off combination of the sensor protrusions 33.

In the main body 11, an arm-like platen holder 82 extending in the front-rear direction is disposed at the outside of an upper portion of the cartridge holder 8. The platen holder 82 is pivotally supported so as to be swingable about a shaft support portion 121. The platen roller 84 and the pressing roller 85 are rotatably supported at a left end portion of the platen holder 82. The platen roller 84 faces the thermal head 10 and can come into contact with and separate from the thermal head 10. The pressing roller 85 faces the conveyance roller 46 and can come into contact with and separate from the conveyance roller 46. Closing the left cover 12 causes a cam mechanism (not depicted) to move the platen holder 82 toward the cartridge holder 8. This moves the platen roller 84 provided in the platen holder 82 to a printing position coming into contact with the thermal head 10. At the printing position, the platen roller 84 presses the thermal head 10 via the printing tape 57 and the ink ribbon 60. At the same time, the pressing roller 85 presses the conveyance roller 46 via the printing tape 57. In this state, the printing tape 57 and the ink ribbon 60 in the tape cartridge 30 are conveyed by the rotation of the ribbon winding roller 44, the conveyance roller 46, the platen roller 84, and the pressing roller 85. Printing is performed on the printing tape 57 by causing the thermal head 10 to transfer the ink of the ink ribbon 60 to the printing tape 57.

A label cutter mechanism (not depicted) is provided between the discharge portion 99 of the main body 11 and the conveyance roller 46. The label cutter mechanism includes a fixed blade and a movable blade. When the cutter button of the operation unit 3 is pressed, the movable blade advances with respect to the fixed blade, cuts the printing tape 57 for which printing has been performed, and produces a printing label (not depicted).

<Structure of Cartridge>

Structure of the tape cartridge 30 is explained. As depicted in FIGS. 2 and 3, the tape cartridge 30 includes a case 31 having a substantially rectangular parallelepiped shape (box shape) in plan view, of which corners are rounded. The case 31 includes a first case 311 (upper side in FIG. 2) and a second case 312 (lower side in FIG. 2). The first case 311 includes a left side plate 305 that forms a left side surface 301 of the case 31. The first case 311 is fixed to a periphery of an opening of the second case 312. The second case 312 includes a bottom plate 306 that defines the bottom surface 302 of the case 31.

The case 31 has four corners 321 to 324 having the same width in an up-down direction in FIG. 2. The first corner 321 is positioned at a lower front side of the case 31, the second corner 322 is positioned at a lower rear side of the case 31, the third corner 323 is provided at an upper rear side of the case 31, and the fourth corner 324 is provided at an upper front side of the case 31. Each of the first to third corners 321 to 323 protrudes outward from a side surface of the case 31 so as to form a right angle in plan view. The fourth corner 324 does not form a right angle, because a discharge guide portion 49 that guides the tape discharged from the tape cartridge 30 is provided at the corner. The corners 321 to 323 are supported by ribs (not depicted) arranged on the corner support surfaces 83 of the cartridge holder 8 when the tape cartridge 30 is installed in the cartridge holder 8.

The case 31 has four support holes 65 to 68 for rotatably supporting a roll or the like provided in the case 31. The tape roll support hole 65 is provided at a lower front portion of the case 31. The cover film roll support hole 66 is provided at a lower rear portion of the case 31. The ribbon roll support hole 67 is provided at an upper rear portion of the case 31. The ribbon winding roll support hole 68 is provided between the tape roll support hole 65 and the ribbon roll support hole 67.

The tape roll support hole 65 rotatably supports the printing tape roll 40 around which the printing tape 57 is wound. The printing tape 57 is pulled out from the printing tape roll 40. After the thermal head 10 performs printing using the ink ribbon 60, the printing tape 57 is guided toward the discharge portion 99. The support hole 67 rotatably supports the ink ribbon roll 42 around which the ink ribbon 60 is wound. The ink ribbon 60 is pulled out from the ink ribbon roll 42, is overlapped with the printing tape 57 pulled out from the printing tape roll 40, and used for printing performed by the thermal head 10. The ribbon winding roll support hole 68 rotatably supports the ribbon winding roller 44. The ribbon winding roller 44 winds the ink ribbon 60 after being used for printing. For example, when the cartridge 8 uses a laminate type cover film as the printing tape, a cover film roll (not depicted) around which the cover film is wound is rotatably supported by the cover film roll support hole 66.

The lower recessed wall 360 is provided in a lower portion of the case 31 at a substantially center portion in the front-rear direction. The lower recessed wall 360 forms a recess in which part of the bottom plate 306 is recessed leftward from the bottom surface 302 (a near side of the paper surface of FIG. 3). The lower recess wall 360 has a shape corresponding to the lower support surface 701 of the cartridge holder 8. The lower recessed wall 360 is provided with the detection target 900 that includes the type information of the tape cartridge 30.

The detection target 900 indicates the type information of the tape cartridge 30 by a combination of holes 901 and surfaces 902 in the lower recessed wall 360. The holes 901 and surfaces 902 are provided at positions facing the five sensor protrusions 33 of the cartridge sensor 32 provided in the main body 11. In this embodiment, the detection target 900 defines the type information of the tape cartridge that includes: ink color information of the ink ribbon 60; tape width information of the printing tape 57 in the tape cartridge 30; and tape color information of a base color of the printing tape 57 in the tape cartridge 30.

The holes 901 are circular openings. When the tape cartridge 30 is installed in the cartridge holder 8, the holes 901 function as non-pressing portions that do not press the sensor protrusions 33. The sensor protrusions 33 facing the holes 901 become an off state. When the tape cartridge 30 is installed in the cartridge holder 8, the surfaces 902 function as pressing portions that press the sensor protrusions 33. The sensor protrusions 33 facing the surfaces 902 become an on state.

<Control Systems of Printing Apparatus and Operation Terminal>

Subsequently, referring to FIGS. 4A and 4B, control systems of the label producing apparatus 1 and the operation terminal 100 are explained.

Figure 4A:
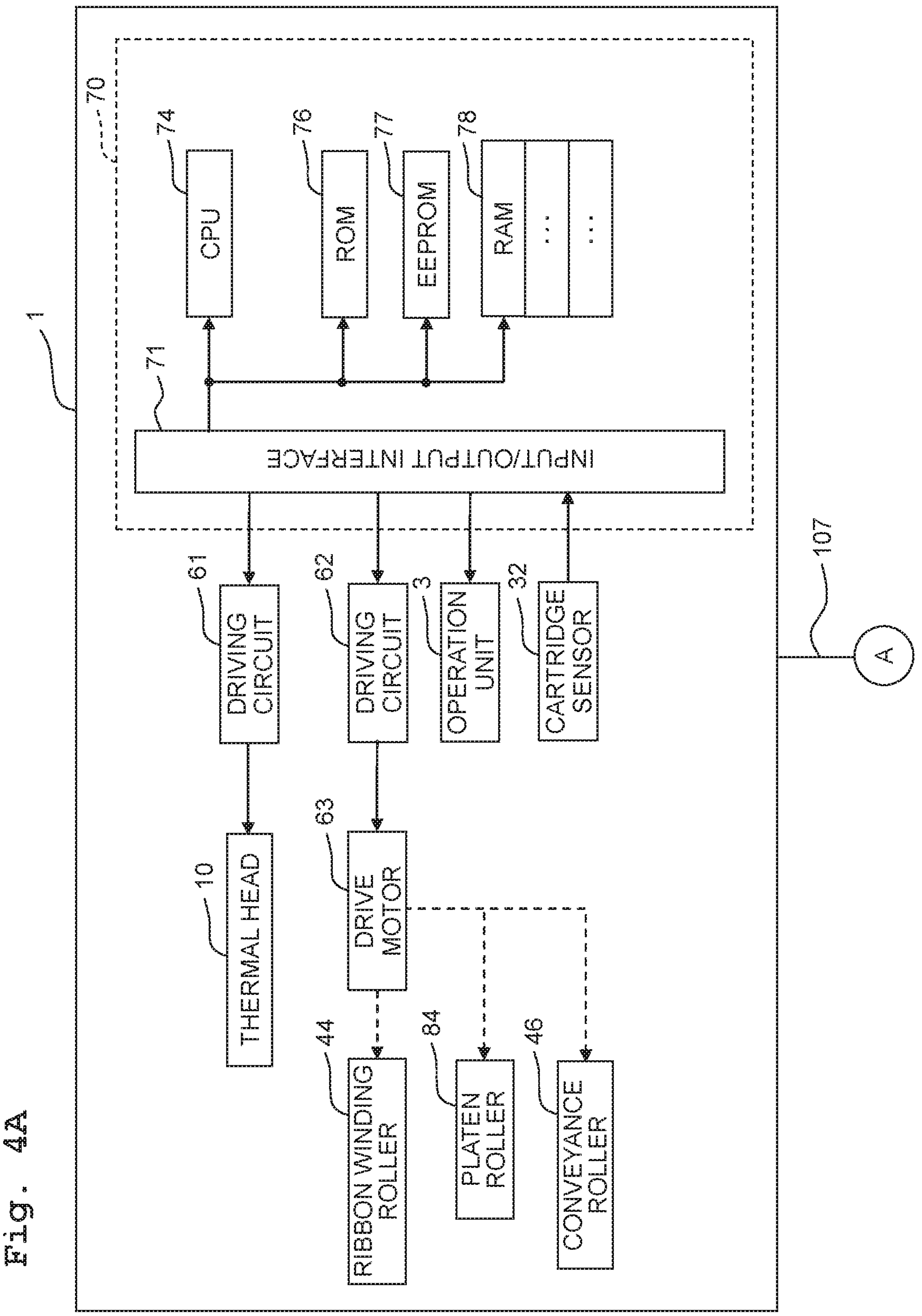
FIGS. 4A and 4B depict a functional block diagram depicting functional configurations of the label producing apparatus and the operation terminal.
Figure 4B:
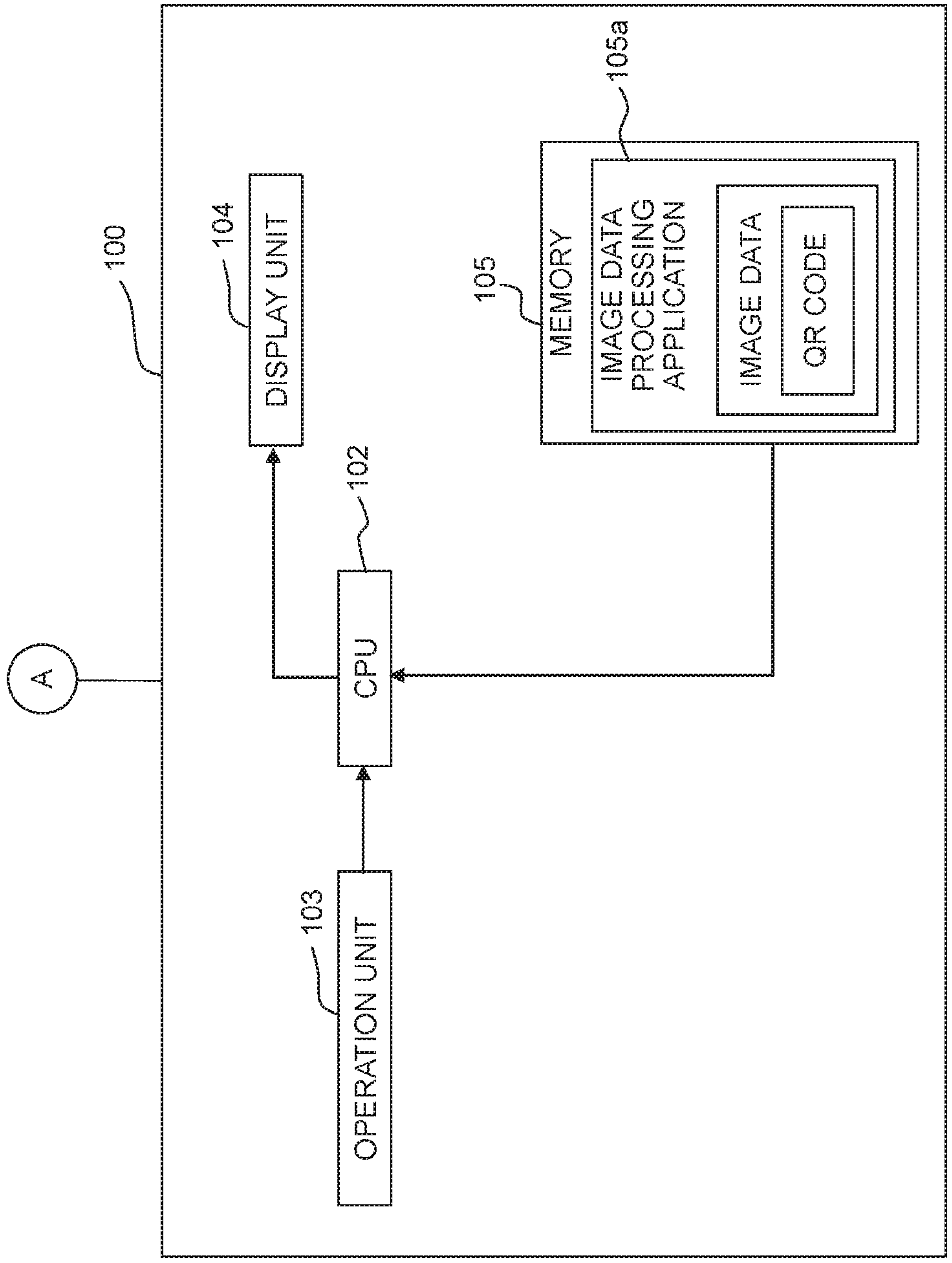

As depicted in FIGS. 4A and 4B, the label producing apparatus 1 includes a control system having a control circuit 70 including a CPU 74. In the control circuit 70, the CPU 74 is connected to a ROM 76, a RAM 78, an EEPROM 77, and an input/output interface 71 via a data bus. Instead of the EEPROM 77, a non-volatile memory such as a flash memory may be used.

The ROM 76 stores various programs required for controlling the label producing apparatus 1. The CPU 74 performs various calculations based on various programs stored in the ROM 76.

The RAM 78 temporarily saves various calculation results by the CPU 74.

The EEPROM 77 saves a cartridge database in which a cartridge model number that is the type information of the tape cartridge 30 is associated with the tape width of the printing tape 57 in the tape cartridge 30.

The input/output interface 71 is connected to the operation unit 3, a thermal head driving circuit 61, a motor driving circuit 62, the cartridge sensor 32, and the like.

The thermal head drive circuit 61 controls the driving of the thermal head 10.

The motor driving circuit 62 controls the driving of the drive motor 63 to rotate the ribbon winding roller 44 through a gear (not depicted). The rotation of the gear is transmitted to a platen roller gear and a conveyance roller gear (not depicted), which rotates the platen roller 84 and the conveyance roller 46.

As depicted in FIGS. 4A and 4B, the operation terminal 100 includes a control system having a CPU 102. The CPU 102 (calculation circuit) is connected to an operation unit 103, a display unit 104, a memory 105 (memory), and the like. An image data processing application 105*a* (image data processing program) described below is saved in the memory 105. The memory 105 has a storage area for developing and saving image data to be processed by the image data processing application. Further, in this embodiment, the image data to be processed includes a two-dimensional code, such as a QR code (registered trademark) (see FIG. 5 and the like described below).

The operation terminal 100 is connected to the label producing apparatus 1 via the USB cable 107 or the like so that the operation terminal 100 can send and receive signals to and from the label producing apparatus 1.

In the operation terminal 100, a user can operate the operation unit 103 to generate image data for printing the printing label by the label producing apparatus 1. The generated image data can be transmitted to the label producing apparatus 1. A control program used in this situation is the image data processing application 105*a*. A predefined label producing instruction including the image data is output to the label producing apparatus 1 by the operation of the operation unit 103 by the user on the image data processing application 105*a*. In response to this, in the label producing apparatus 1, the platen roller 84, the conveyance roller 46, and the like are driven via the motor driving circuit 62 and the driving motor 63, and the printing tape 57 is fed out from the printing tape roll 40. In synchronization with this, the heating elements of the thermal head 10 are selectively driven to generate heat via the thermal head driving circuit 61, and the ink of the ink ribbon 60 fed out from the ink ribbon roll 42 is transferred to the printing tape 57 fed and conveyed. Accordingly, printing based on the image data is performed on the printing tape 57. The printing label having the predefined printing is produced by cutting the printing tape 57 for which printing has been performed by a label cutter mechanism (not depicted).

The user can replace the tape cartridge 30 with another tape cartridge as appropriate. Thus, the user can produce printing labels having various tape widths by changing the tape widths of the printing tape 57 and the ink ribbon 60. In this embodiment, the label producing apparatus 1 includes the cartridge sensor 32. When the tape cartridge 30 is installed in the cartridge holder 8, the cartridge model number of the tape cartridge 30 is obtained depending on the detection result from the cartridge sensor 32. Information (details are described below) corresponding to the obtained model number of the tape cartridge 30 is transmitted from the label producing apparatus 1 to the operation terminal 100. The operation terminal 100 thus obtains the tape width of the printing tape 57 based on the transmitted information.

As a result, the tape width of the printing tape 57 in the tape cartridge 30 currently installed is displayed, for example, on an editing screen of the display unit 104. The user thus recognizes the tape width before the printing label is produced. The cartridge sensor 32 mechanically detects information such as the tape width of the printing tape 57. However, the cartridge sensor 32 may optically detect information such as the tape width of the printing tape 57.

<Characteristics of this Embodiment>

This embodiment is characterized in that the image data processing application executed on the operation terminal processes image data so that the reading accuracy of the QR code can be maintained even when the above label producing apparatus performs so-called split printing for the image data including the QR code. In the following, a specific processing approach thereof is explained in detail.

<Split Printing and QR Code>

Figure 5:
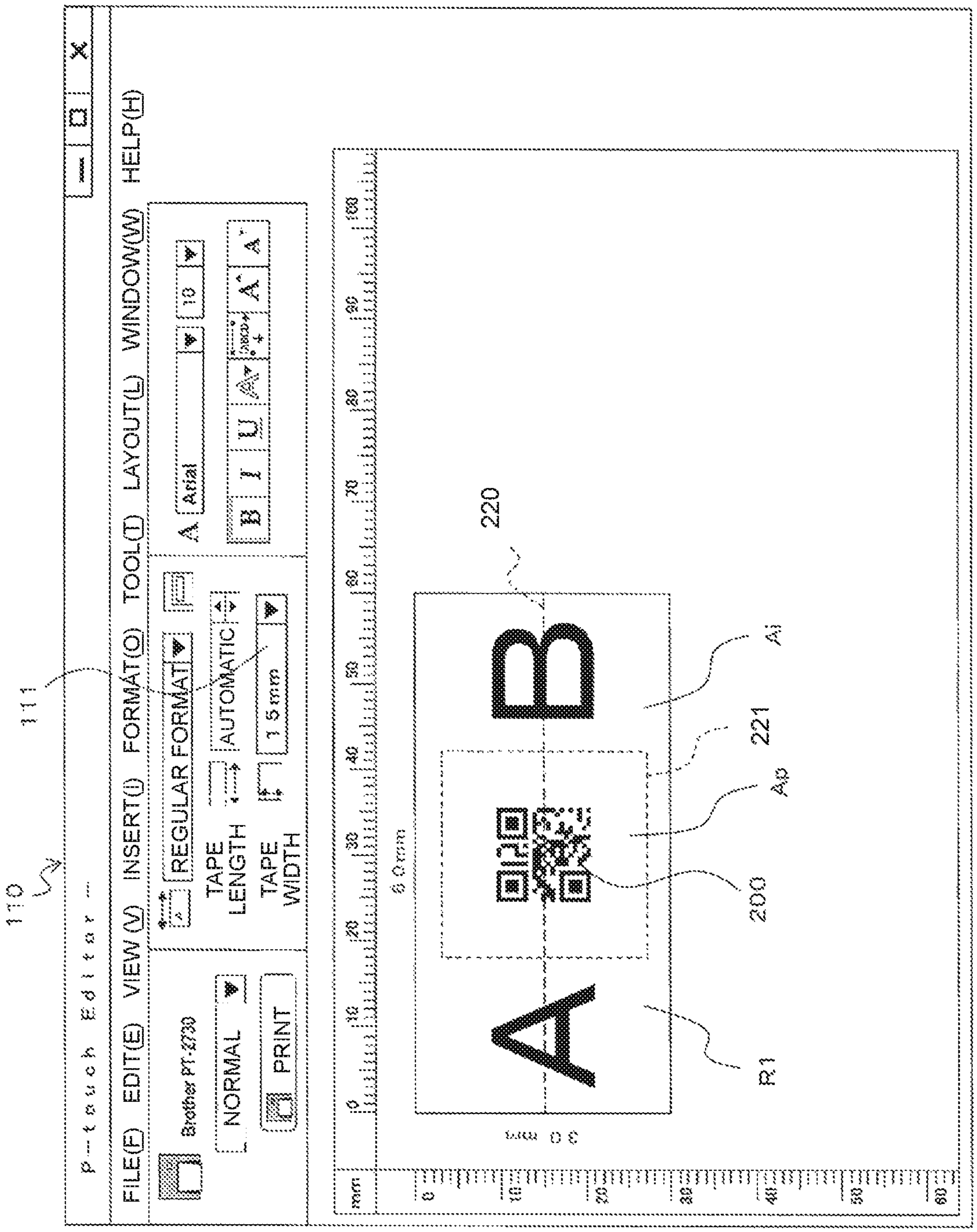
FIG. 5 is a display example of image data displayed on an input operation screen when an image data processing application is started on the operation terminal. A boundary 221 (broken line) depicts a boundary between an allowable area Ap and a prohibition area Ai.

FIG. 5 depicts a display example of the input operation screen 110 displayed on the display unit 104, when the image data processing application is activated on the operation terminal 100. In FIG. 5, the input operation screen 110 in a so-called Graphical User Interface (GUI) form is displayed. A print image R1 of image data that has already been generated and saved in the memory 105 is displayed on the input operation screen 110 of the image data processing application. This image data is data including information about a predetermined graphical image and characters that are arranged in an area defined by a specific label width and label length, and their arrangement information. A user can obtain and process the graphical image by use of a template (not depicted) or the like, and can input any text (character information) in a character entry column. Accordingly, the user can easily generate image data by using the template (not depicted) or the like.

In the image data of an example depicted in the figure, at a center position of the image, an allowable area Ap (first area) in which the arrangement of a QR code 200 is allowed is set as a square having an appropriate dimension. The QR code 200 is arranged therein. The outside of the allowable area Ap is set as a prohibition area Ai (second area) in which the arrangement of the QR code 200 is prohibited. In the prohibition area Ai, character information "A" is arranged on a left side of the allowable area Ap, and character information "B" is arranged on a right side of the allowable area Ap.

In this embodiment, when the width dimension of the printing tape 57 to be subjected to printing by the label producing apparatus 1 is small in comparison with a piece of image data to be printed, split printing is performed so that the image data is divided into a plurality of pieces of image data and printing for each divided image data is performed on the printing tape 57. The user can obtain an aggregate of printing labels representing the piece of image data by combining the printed labels (see FIG. 6 described below) after printing generated as described above in accordance with an appropriate manner (in the example depicted in the figure, an arrangement in which the labels are arranged adjacent to each other in parallel).

When the split printing is performed as described above, in the input operation screen 110 displayed by the image data processing application of the operation terminal 100, the width dimension (30 mm in the example depicted in the figure) of the entire printing label (the aggregate of the printing labels) is set by an integral multiple (double in the example depicted in the figure) of the tape width (a width of the printing medium, 15 mm in the example depicted in the figure) of the printing tape 57 of the tape cartridge 30 installed in the cartridge holder 8. The tape width of the printing tape 57 may be automatically obtained based on the type information of the tape cartridge 30 detected by the cartridge sensor 32 as described above. Or, a user may set a desired tape width by operating, for example, a pull-down menu 111.

In the image data processing application, the entire image data generated on the input operation screen 110 is divided by a number corresponding to the tape width of the printing tape 57 to generate a plurality of pieces of first divided image data. Then, the plurality of pieces of first divided image data are output to the label producing apparatus 1 individually and printing labels are produced respectively. As an example of the input operation screen 110 depicted in the figure, a divided boundary line 220, where the plurality of pieces of divided image data for respective printing labels to be produced are adjacent to each other, may be displayed corresponding to the tape width of the printing tape 57.

Figure 6:
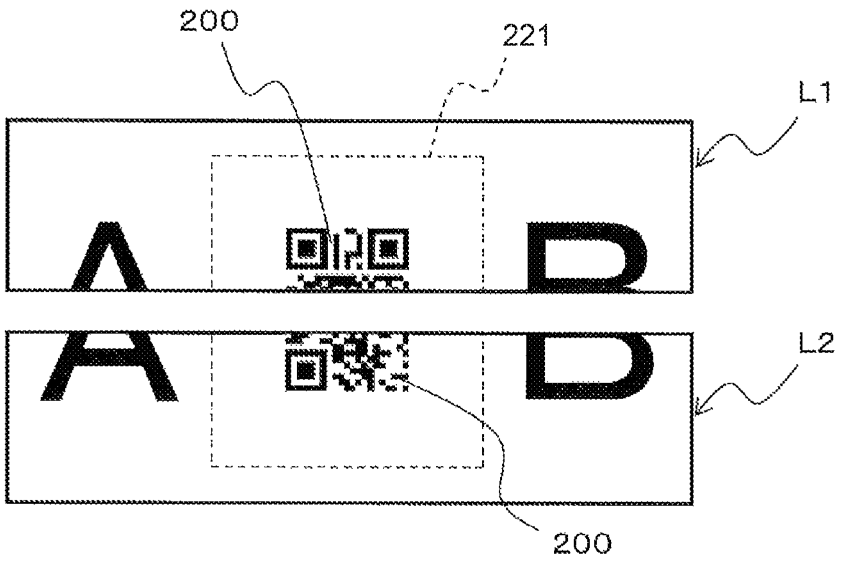
FIG. 6 depicts a printing form of each split label when divided image data of the display example of FIG. 5 is printed.

However, in the split printing in which divided printing is performed using the printing labels, like printing labels (hereinafter referred to as split labels L1 and L2) as depicted in FIG. 6, the QR code 100 included in the image data (a first two-dimensional code) may be divided. A boundary 221 (broken line) between the allowable area Ap and the prohibition area Ai depicted in FIG. 6 is displayed on the input operation screen 110 for reference, and thus the boundary 221 is not actually printed on the split labels L1 and L2. When a user manually arranges the split labels L1 and L2 obtained by dividing a QR code 200 in split printing so that the split labels L1 and L2 are adjacent to each other, the split label L1 may be slightly shifted from the split label L2. In that case, the entire QR code 200 may not be read well by the barcode scanner due to the slight shift between the split labels L1 and L2.

Figure 7A:
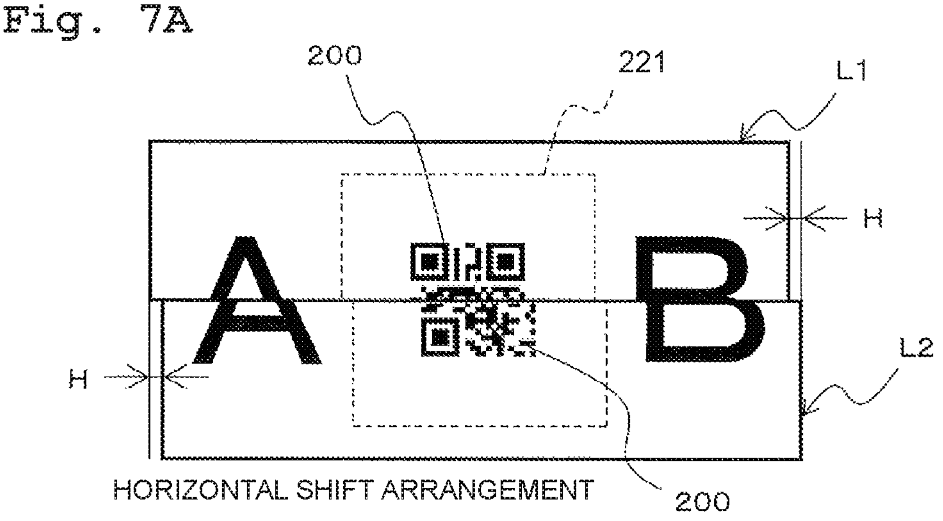
Figure 7B:
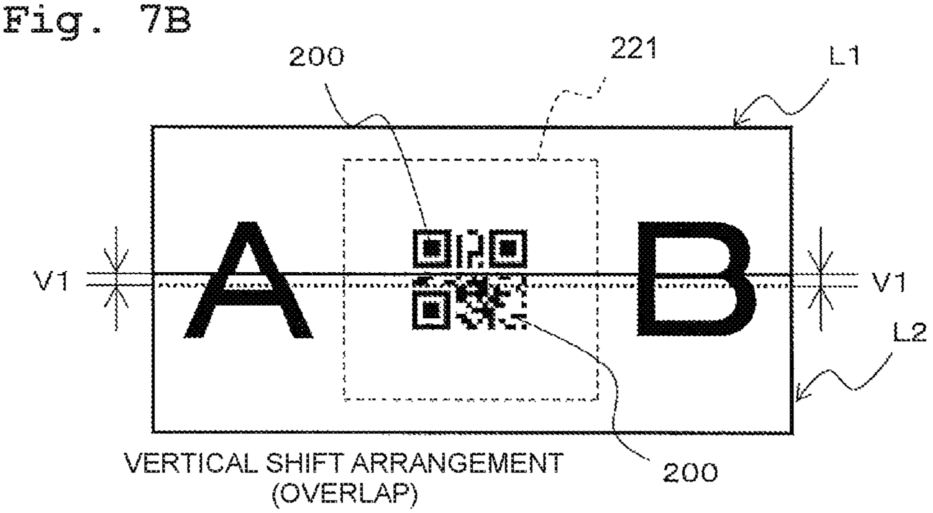
Figure 7C:
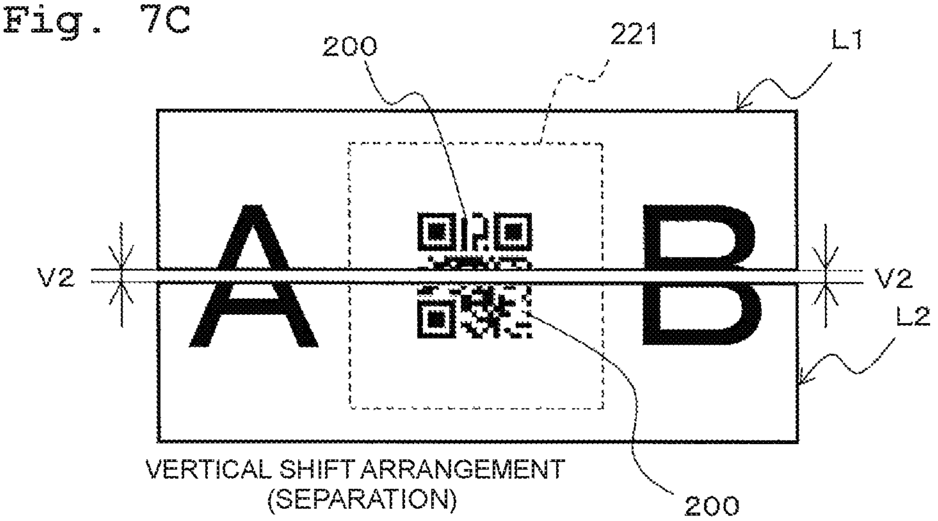

Specifically, a horizontal shift arrangement, depicted in FIG. 7A, in which the split label L1 is shifted from the split label L2 in a horizontal direction (label length direction) by an error H, a vertical shift arrangement, depicted in FIG. 7B, in which the split label L1 overlaps in a vertical direction (label width direction) with the split label L2 by an error V1, and another vertical shift arrangement, depicted in FIG. 7C, in which the split label L1 is separated from the split label L2 in the vertical direction (label width direction) by an error V2 may be caused. When an error of each of the shift arrangements is larger than a predefined error, the reading accuracy by the barcode scanner is greatly reduced in the entire QR code 100 (hereinafter referred to as a divided two-dimensional code) divided on the split labels L1 and L2.

<First Correction Method for Printing Form of QR Code>

In this embodiment, a printing form of the QR code 200 is corrected by any one of three correction methods for the QR code 200 divided by the image data processing application. This can reliably obtain the reading accuracy by the barcode scanner for each of the shift arrangements. The first correction method is first described below.

The first correction method improves an error correction level of the QR code 200. As a QR code standard, multiple printing forms corresponding to different error correction levels are prepared even when the contents of the same information are displayed. The printing form corresponding to the error correction level is set in, for example, five levels according to the QR code standard. As the error correction level is lower, a printing area of image data of the QR code is smaller and the reading accuracy is lower. On the other hand, as the error correction level is higher, the printing area of image data of the QR code is larger and the reading accuracy is higher.

Figure 8:
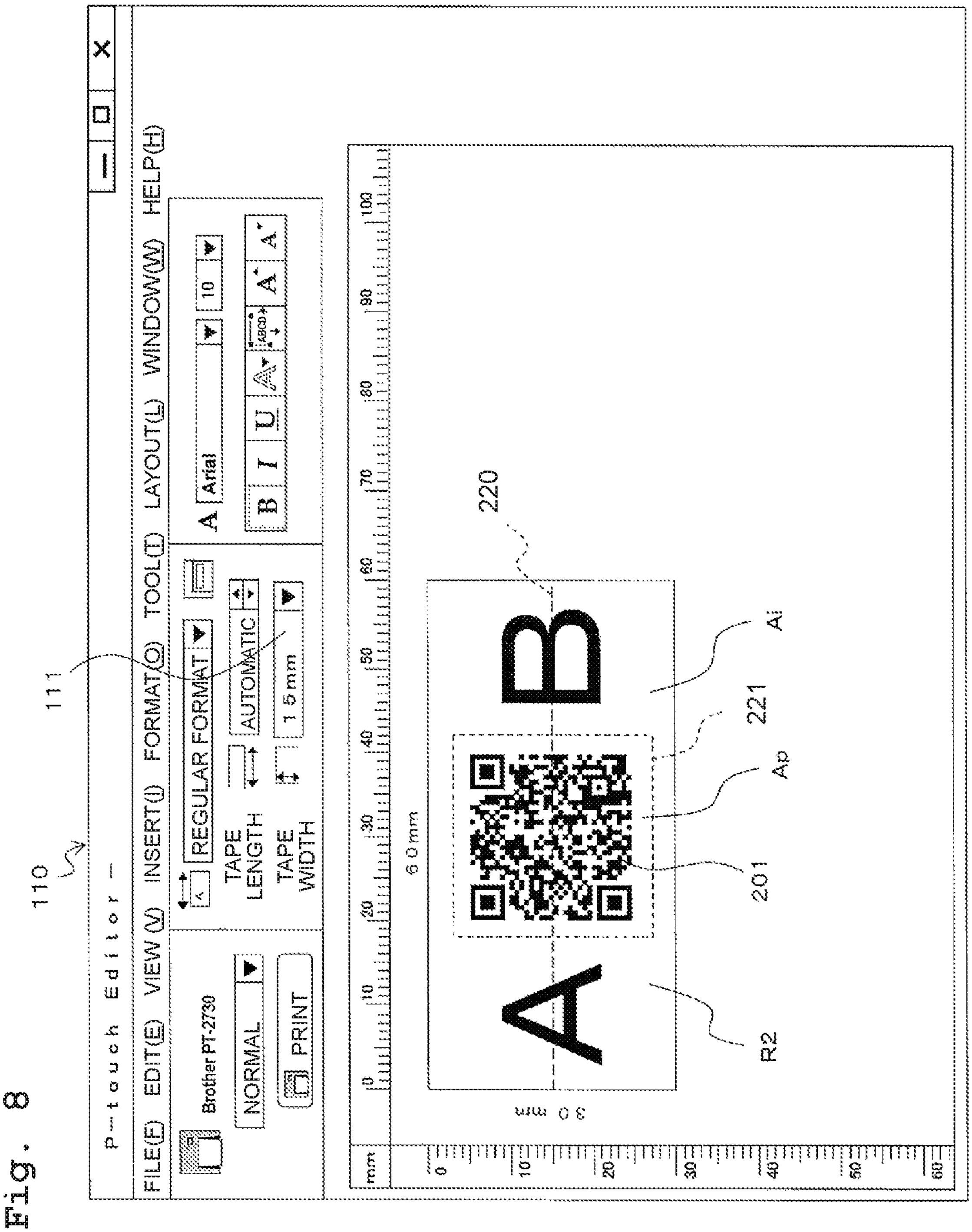
FIG. 8 is a display example on the input operation screen of image data including a QR code that has been corrected to make an error correction level high through the first correction method.
Figure 9:
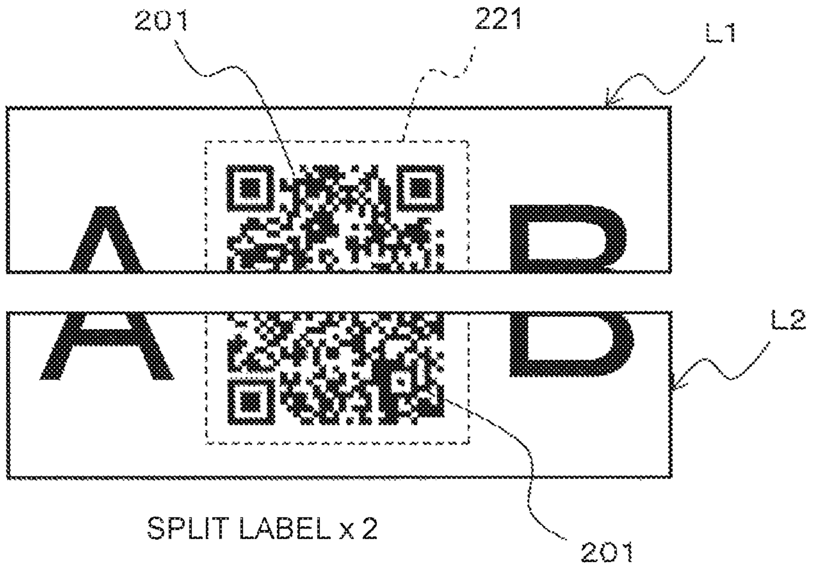
FIG. 9 depicts a printing form of each split label when the QR code corrected by the first correction method is printed.
Figure 10:
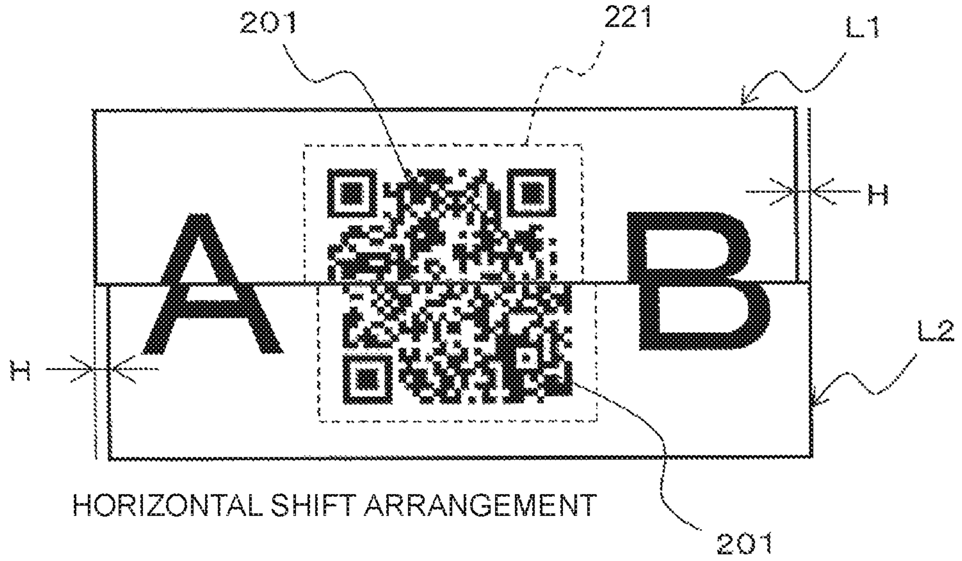
FIG. 10 depicts the horizontal shift arrangement of the split labels on which the QR code corrected by the first correction method is printed.

In this embodiment, when original image data that is first generated for split printing by the image data processing application of the operation terminal 100 is divided into a plurality of pieces of first divided image data, and when it is determined that the QR code 200 included in the image data is also divided, the original QR code 200 is corrected to QR codes 201 having an error correction level (second error correction level) higher than its error correction level (first error correction level). For example, when a dimension of the QR code 200 is sufficiently smaller than the allowable area Ap as depicted in FIG. 5, the QR code 200 may be positioned within the allowable area Ap even when the QR code 200 is corrected to the QR codes 201 having a higher error correction level as depicted in FIG. 8. Making the error correction level higher appropriately improves the reading accuracy of the entire QR code 200, even when the split labels L1 and L2 for which split printing has been performed as depicted in FIG. 9 are arranged in, for example, a shift arrangement as depicted in FIG. 10 (a horizontal shift arrangement in the example depicted in the figure).

<Second Correction Method for Printing Form of QR Code>

Figure 11:
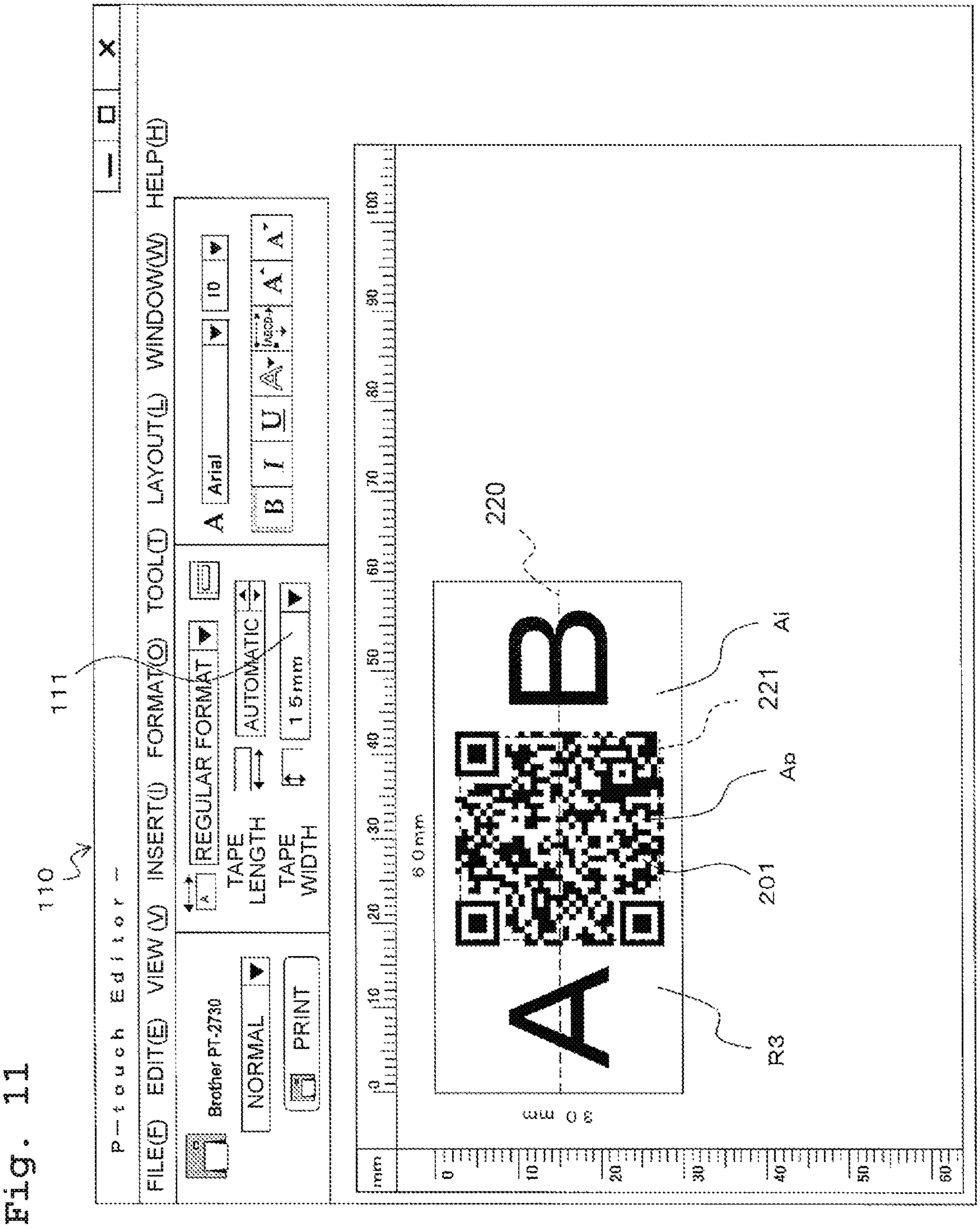
FIG. 11 is a display example on the input operation screen of image data when the QR code corrected by the first correction method is not positioned within an allowable area.
Figure 12:
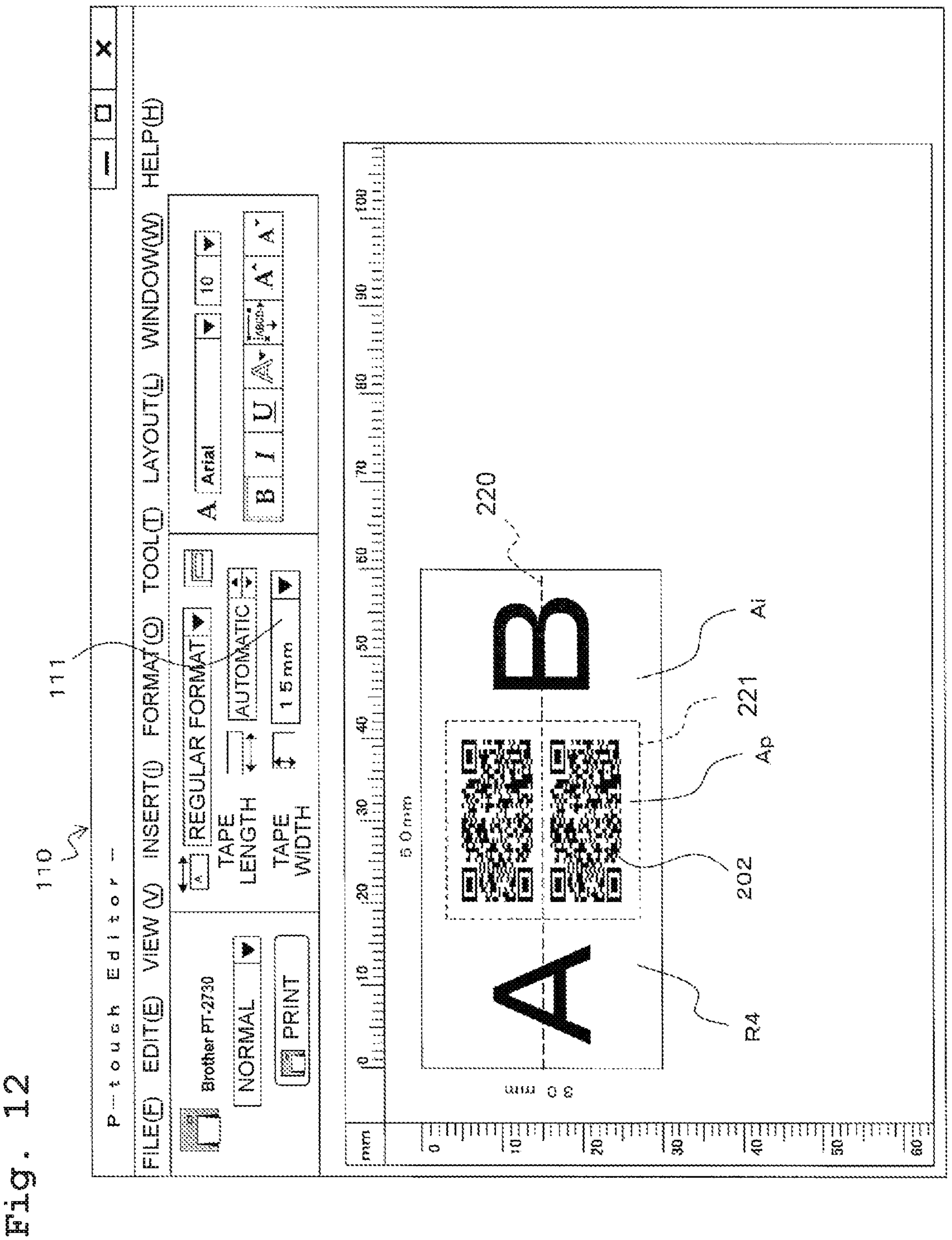
FIG. 12 is a display example on the input operation screen of image data including QR codes corrected by the second correction method.

The second correction method for the printing form of the QR code 200 is a method in which the original single QR code 200 is newly generated as a plurality of independent QR codes. For example, when the original QR code 200 is corrected to the QR codes 201 having a higher error correction level by the first correction method, the QR codes 201 may not be positioned within the allowable area Ap as depicted in FIG. 11. On this occasion, the image data processing application of the operation terminal 100 newly generates QR codes (hereinafter referred to as QR codes 202 (second two-dimensional code)) that are not divided by split printing as depicted in FIG. 12 (namely, do not overlap with the divided boundary line 220) and can be entirely positioned within the allowable area Ap.

Figure 13:
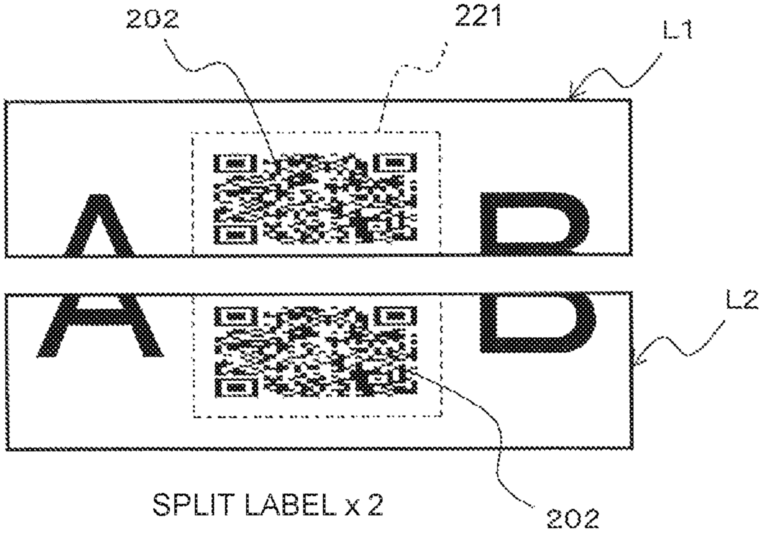
FIG. 13 depicts a printing form of each split label when the QR codes corrected by the second correction method are printed.
Figure 14:
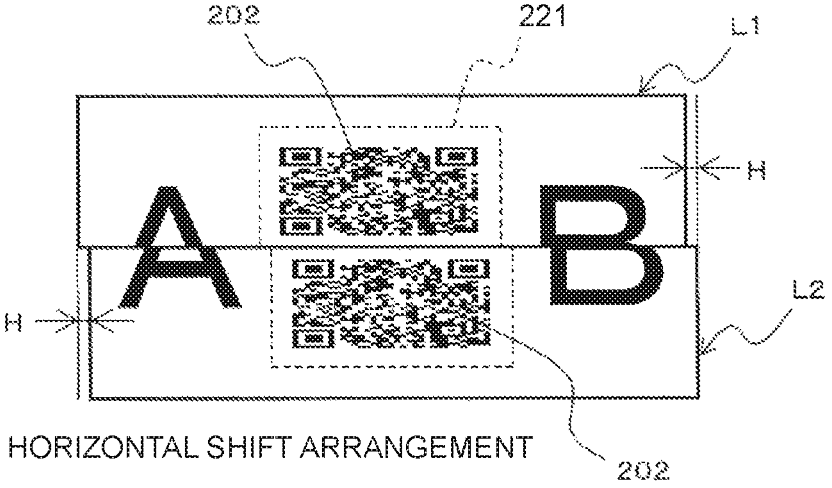
FIG. 14 depicts the horizontal shift arrangement of the split labels on which the QR codes corrected by the second correction method are printed.

Typically, the printing area is smaller, as the amount of information of the QR code to be displayed is smaller. The contents of information displayed by the original QR code 200 are thus divided, and individual QR codes having a smaller information amount are newly generated. This results in the QR codes 202 that have a smaller printing area and can be entirely positioned within the allowable area Ap. When the QR codes 202 are printed on the split labels L1 and L2 as depicted in FIG. 13, the QR codes 202 can be read accurately even when the split labels L1 and L2 are arranged in, for example, a shift arrangement depicted in FIG. 14 (a horizontal shift arrangement in the example depicted in the figure). It is possible to obtain the substantially same information as the original QR code 200 by reading all the QR codes 202 by the barcode scanner.

<Third Correction Method for Printing Form of QR Code>

Figure 15:
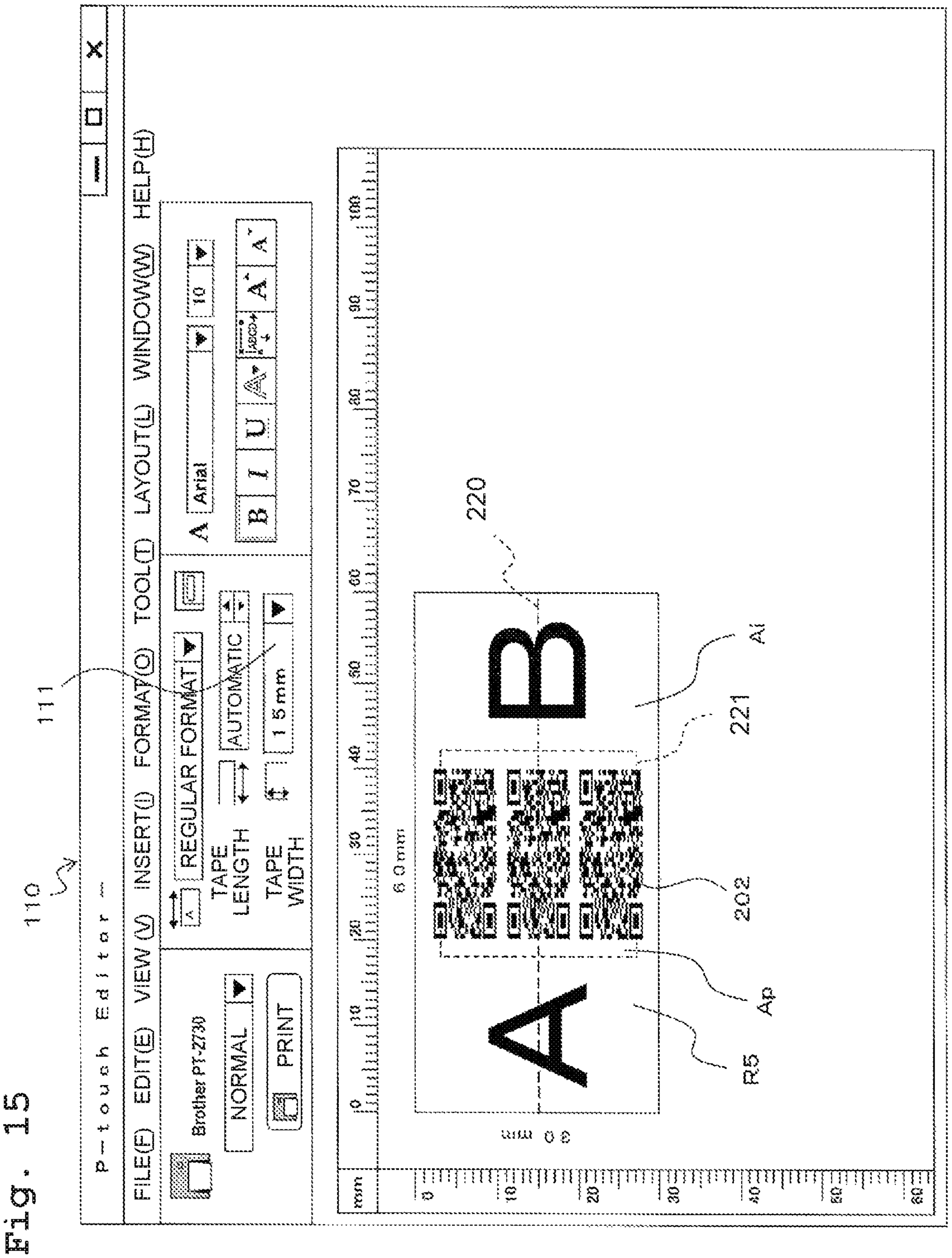
FIG. 15 is a display example on the input operation screen of image data when the entirety of the QR codes corrected by the second correction method is not positioned within the allowable area.
Figure 16:
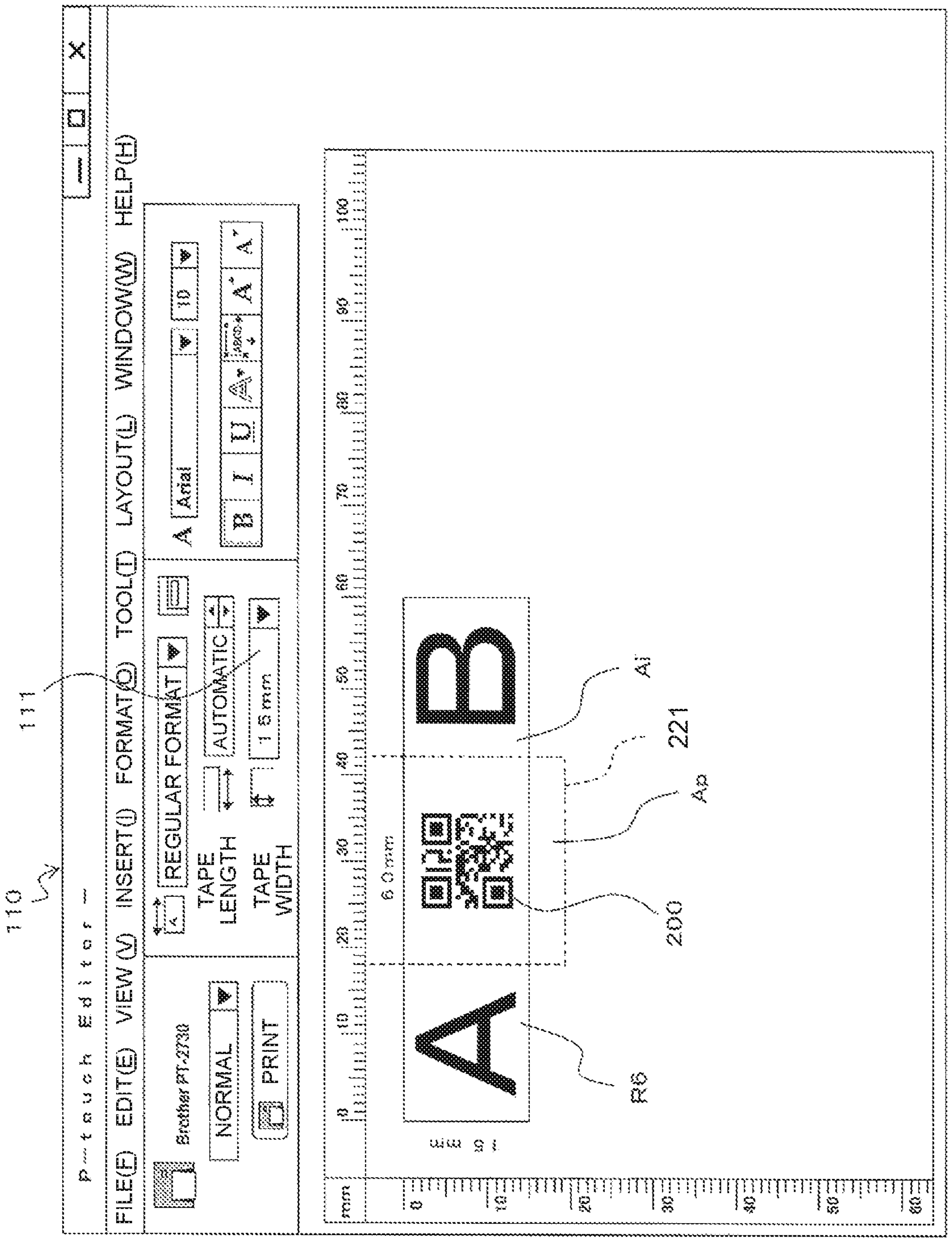
FIG. 16 is a display example on the input operation screen of QR code image data including an original QR code and generated by the third correction method.
Figure 17:
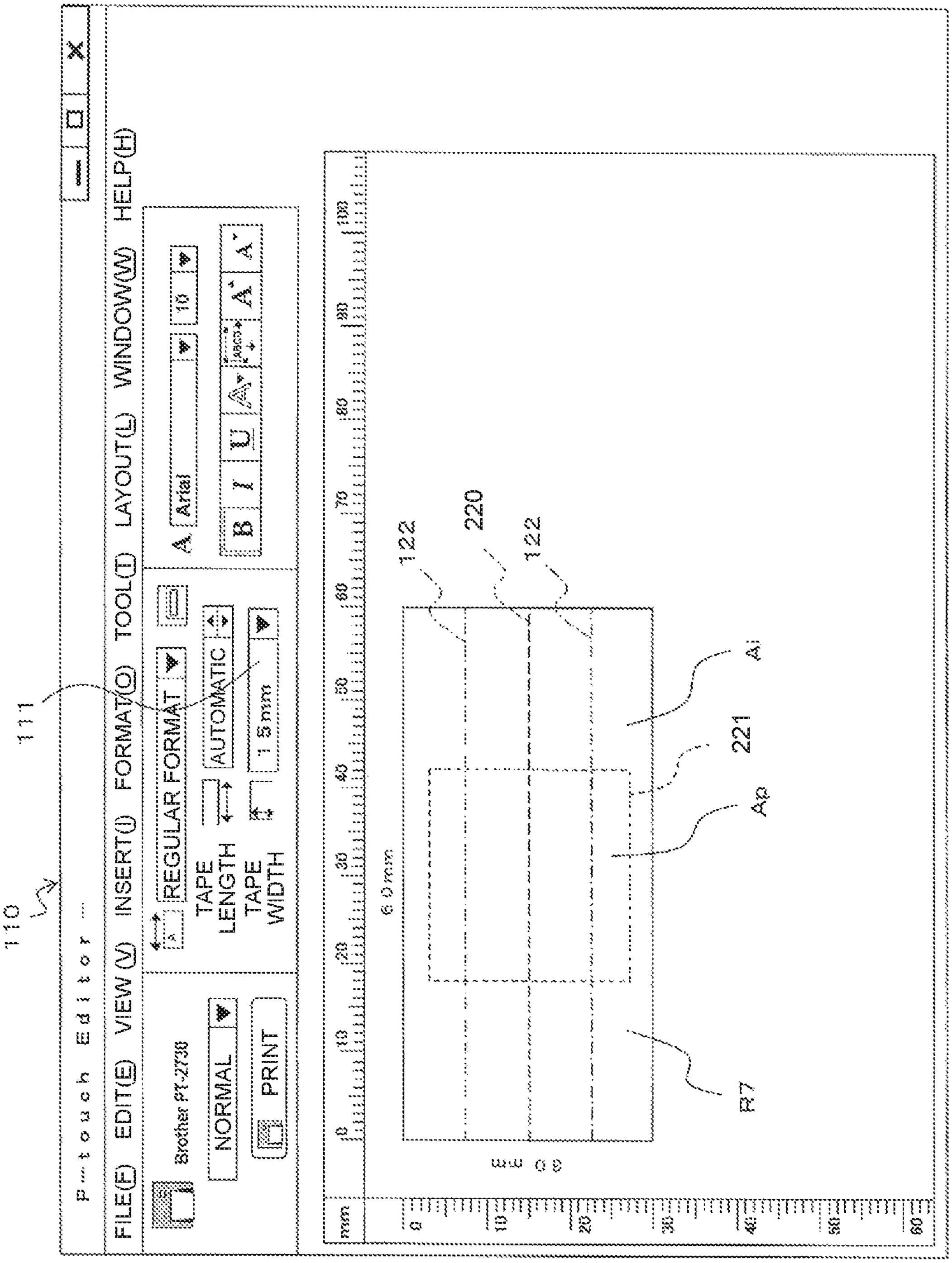
FIG. 17 is a display example on the input operation screen of the second divided image data in which the QR code is omitted by the third correction method.

The third correction method for the printing form of the QR code is a method of producing a dedicated split label that is used for printing the original QR code 200 without dividing it. For example, when a plurality of QR codes 202 that display substantially the same information contents as the original QR code 200 are generated by the second correction method, the entirety of the QR codes 202 may not be positioned within the allowable area Ap, as depicted in FIG. 15. Or, any of the QR codes 202 may have to be divided by split printing depending on the number of QR codes 202 generated and their arrangement. In order to deal with such a case, the image data processing application of the operation terminal 100 generates QR code image data for printing the original QR code 200 without dividing it as depicted in FIG. 16 and a plurality of pieces of second divided image data obtained by dividing the original image data in a manner in which the QR code 200 is omitted as depicted in FIG. 17.

In the third correction method, the QR code 200 included in the QR code image data is not divided by the split labels L1, L2, and L3, and thus the original QR code 200 with a low error correction level and a small print area may be used as it is, as depicted in the example in the figure. Although not depicted in the figure, when the original QR code 200 is not positioned within the tape width of the printing tape 57, the error correction level may be lowered to correct the original QR code 200 to a QR code having a smaller printing area. Further, printing characters "A" and "B" other than the QR code 200 are also included in the QR code image data in the same arrangement. In the example depicted in the figure, a case in which the printing characters "A" and "B" other than the QR code 200 are positioned within the tape width of the printing tape 57 (the printing characters "A" and "B" and the QR code are positioned within the QR code image data) is depicted. However, the printing image(s) other than the QR code 200 may extend beyond the tape width, and the extending portion(s) may be included in the plurality of pieces of second divided image data. Further, as depicted in FIG. 17, images of guide lines 122 (dot-dash chain lines in the example depicted in the figure) may be included in the plurality of pieces of second divided image data.

Figure 18:
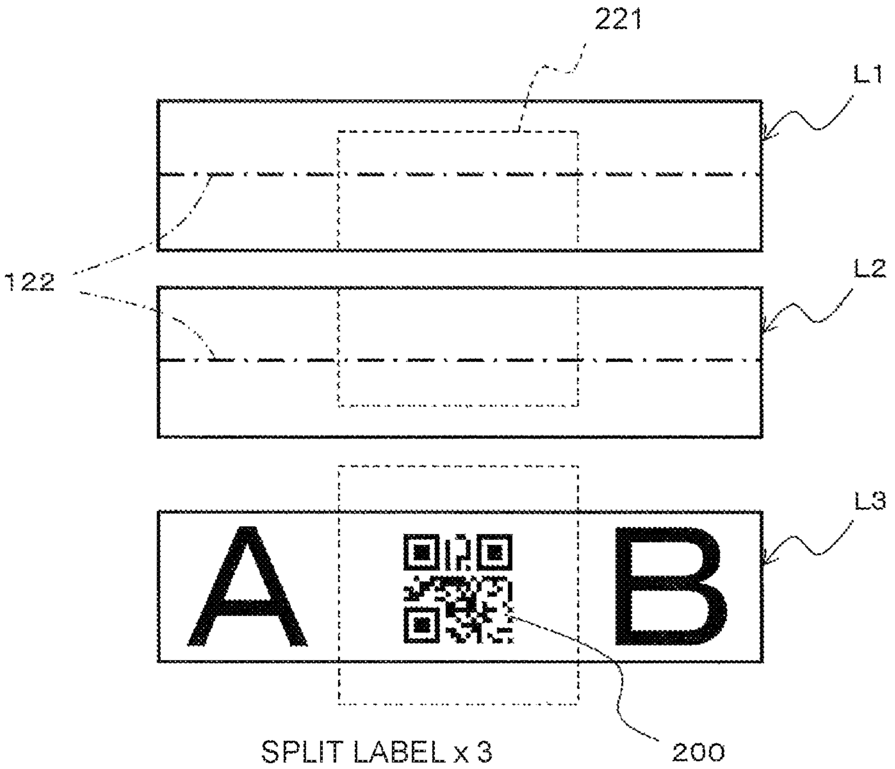
FIG. 18 depicts a printing form of each split label when the second divided image data and the QR code image data generated by the third correction method are printed.
Figure 19:
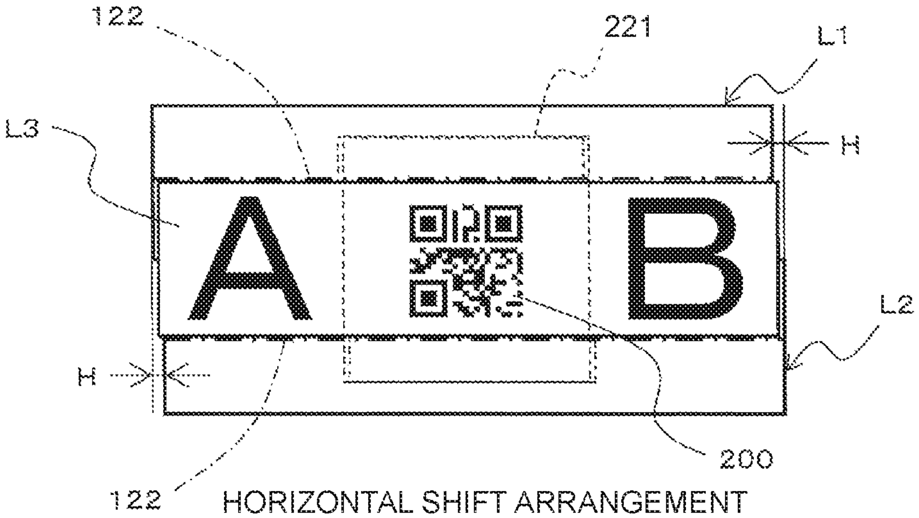
FIG. 19 depicts the horizontal shift arrangement of the split labels on which the second divided image data and the QR code image data generated by the third correction method are printed.

As depicted in FIG. 18, the split labels L1 and L2 each printed with the second divided image data from which the QR code 200 is omitted and a single split label L3 printed with the QR code image data are generated (3 labels in total in the example depicted in the figure). Then, as depicted in FIG. 19, the single split label L3 (second printing matter) printed with the QR code image data can be arranged at an appropriate position to overlap with the split labels L1 and L2 (first printing matter) arranged adjacent to each other and each printed with the second divided image data. This results in an aggregate of the printing labels of which printing contents are close to the original image data (e.g., image data depicted in FIG. 5).

Even when the split labels L1 and L2 printed with the second divided image data and positioned under the split label L3 are arranged in a shift arrangement as depicted in FIG. 19 (a horizontal shift arrangement in the example depicted in the figure), the display of the QR code 200 on the split label L3 printed with the QR code image data is not affected by the shift arrangement at all, and the normal reading accuracy can be reliably obtained. The guide lines 122 to be printed on the split labels L1 and L2 each printed with the second divided image data can be printed at appropriate positions as mark images that allow the split label L3 printed with the QR code 200 to be arranged at an appropriate position and to overlap with the split labels L1 and L2.

<Control Procedure>

Figure 20A:
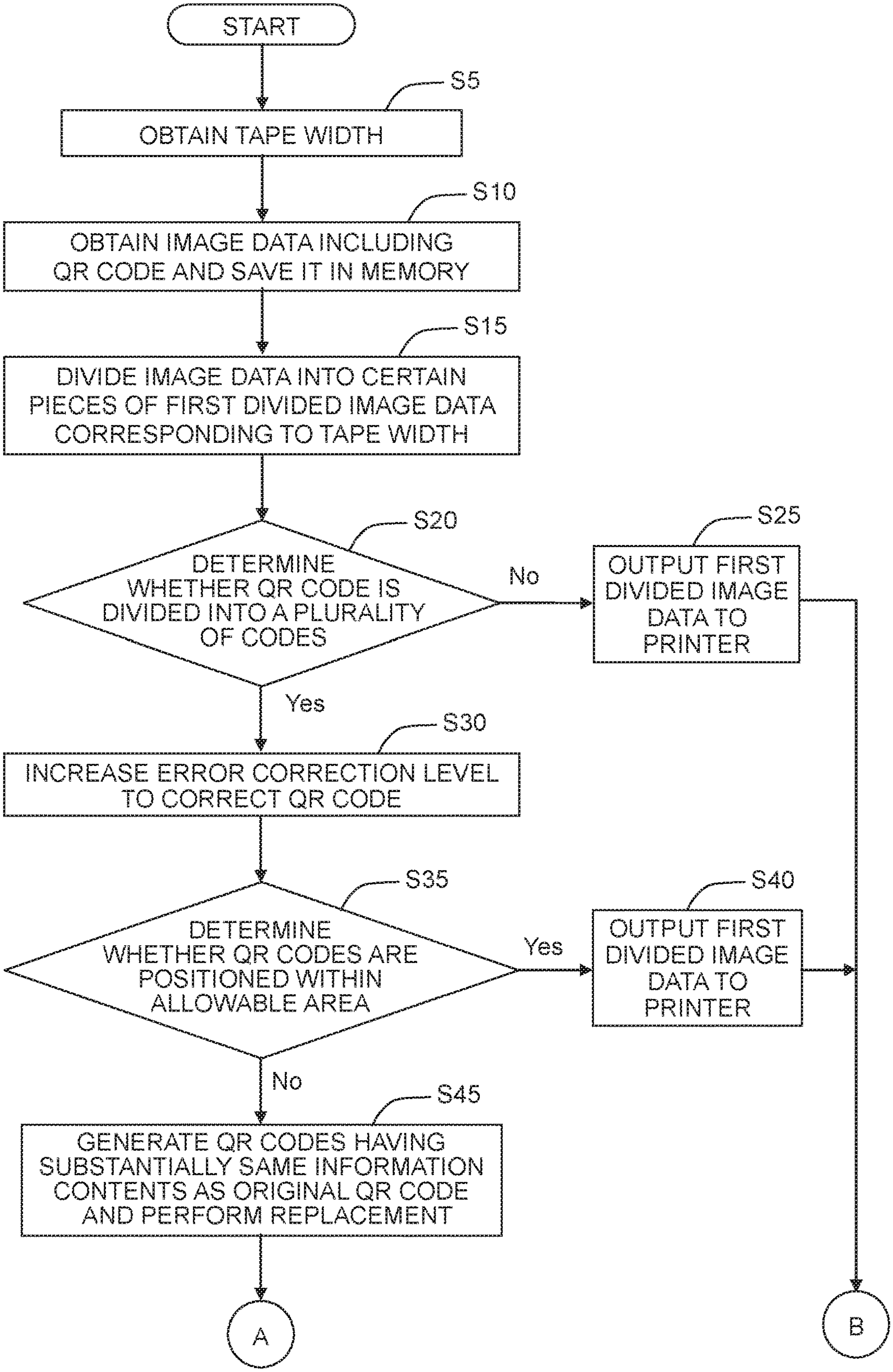
FIGS. 20A and 20B depict a flowchart indicating a control procedure of the image data processing application executed by a CPU of the operation terminal.
Figure 20B:
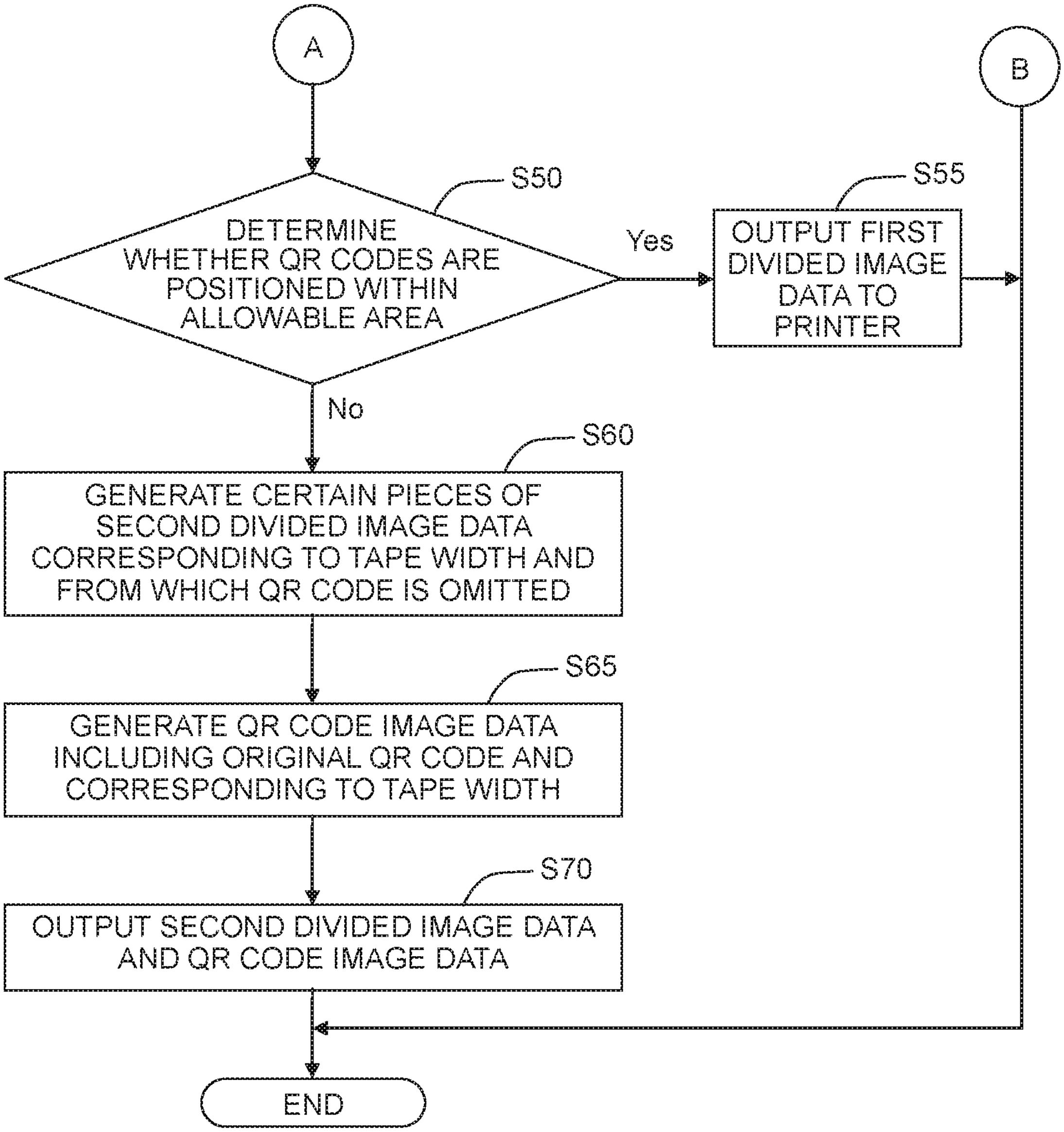

FIGS. 20A and 20B indicate a control procedure executed by the CPU 102 of the operation terminal 100 for achieving a correction process for the printing form of the QR code. In the example depicted in the figure, the flow of FIGS. 20A and 20B starts when the execution of the image data processing application on the operation terminal 100 starts.

The CPU 102 obtains the tape width of the printing tape 57 (step S5) based on the type information of the tape cartridge 30 detected by the cartridge sensor 32 and any setting information from a user. The procedure in the step S5 corresponds to a width obtaining procedure.

Then, the CPU 102 obtains image data including the QR code 200, and saves it in the memory 105 (S10). The procedure in step S10 is referred to as a save processing procedure.

The CPU 102 divides the image data saved in the step S10 into certain pieces of first divided image data (see FIG. 5) corresponding to the tape width obtained in the step S5 (S15). The procedure in the step S15 is referred to as a data dividing procedure.

The CPU 102 determines whether the QR code 200 included in the original image data is divided into a plurality of pieces of data by the division of the first divided image data in the step S15 (S20). The procedure in the step S20 is referred to as a first determination procedure. When the QR code 200 is not divided (S20: NO), the determination is not satisfied (S20: NO) and the CPU 102 proceeds to a step S25.

In the step S25, the CPU 102 outputs the plurality of pieces of first divided image data divided in the step S15 to the label producing apparatus 1 (in the figure, referred to as a printer in an abbreviated manner, the same hereinafter) and causes the label producing apparatus 1 to produce the split label L1 and L2 corresponding to the plurality of pieces of first divided image data. In this case, the entire QR code 200 is printed on any one of the split labels, and thus the reading accuracy of the QR code 200 can be reliably obtained without being affected by the shift arrangement between the split labels L1 and L2 (not depicted). Then, the CPU 102 ends the series of procedures.

When the CPU 102 has determined in the step S20 that the QR code 200 is divided (S20: YES), the CPU 102 proceeds to a step S30.

In the step S30, the CPU 102 corrects the QR code 200 included in the image data to the QR codes 201 having a higher error correction level, and replaces the QR code 200 by the QR codes 201 (first correction method). The procedure in the step S30 is referred to as a level enhancement processing procedure.

The CPU 102 determines whether the QR codes 201 set in the step S30 are positioned within the allowable area Ap (S35). The procedure in the step S35 is referred to as a second determination procedure. When the QR codes 201 are positioned within the allowable area Ap (S35: YES), the CPU 102 proceeds to a step S40.

In the step S40, the CPU 102 outputs the plurality of pieces of first divided image data that include the QR codes 201 of which error correction level is increased in the step S30 to the label producing apparatus 1, and causes the label producing apparatus 1 to produce the split label L1 and L2 corresponding to the plurality of pieces of first divided image data. Then, the CPU 102 ends the series of procedures. The procedure in the step S40 is referred to as a first data output procedure.

When the CPU 102 has determined in the step S35 that the QR codes 201 are not positioned within the allowable area Ap (S35: NO), the CPU 102 proceeds to a step S45.

In the step S45, the CPU 102 generates the QR codes 202 having the substantially same information contents as the original QR code 200, and replaces the QR code 200 by the QR codes 202 in the plurality of pieces of first divided image data (second correction method). The procedure in the step S45 is referred to as a second two-dimensional code generating procedure.

The CPU 102 determines whether all of the QR codes 202 are positioned within the allowable area Ap (S50). Further, although not depicted in the figure, the CPU 102 determines whether none of the QR codes 202 is divided. The procedure in the step S50 is referred to as a third determination procedure. When the entirety of the QR codes 202 are positioned within the allowable area Ap and none of the QR codes 202 is divided (S50: YES), the CPU 102 proceeds to a step S55.

In the step S55, the CPU 102 outputs the plurality of pieces of first divided image data obtained by replacing the QR code 200 by the QR codes 202 in the step S45, to the label producing apparatus 1. Then, the CPU 102 causes the label producing apparatus 1 to produce the split labels L1 and L2 corresponding to the plurality of pieces of first divided image data. After that, the CPU 102 ends the series of the procedures. The procedure in the step S55 is referred to as a second data output procedure.

In the determination in the step S50, when any of the QR codes 202 is not positioned within the allowable area AP or when any of the QR codes 202 is divided (S50: NO), the CPU 102 proceeds to a step S60.

In the step S60, the CPU 102 generates certain pieces of second divided image data obtained by dividing the image data in which the QR code 200 is omitted from the original image data depending on the tape width (third correction method). The procedure in the step S60 is referred to as a procedure for generating the second divided image data.

The CPU 102 generates a piece of QR code image data including the original QR code 200 and any other printing information depending on the tape width (S65, third correction method). The procedure in the step S65 is referred to as a procedure for generating two-dimensional code image data.

The CPU 102 outputs, to the label producing apparatus 1, second divided image data generated in the step S60 and the QR code image data generated in the step S65 and causes the label producing apparatus 1 to produce the split labels L1, L2, and L3 corresponding to the certain pieces of second divided image data (S70). Then, the CPU 102 ends the series of the procedures. The procedure in the step S70 is referred to as a third data output procedure.

<Effects of this Embodiment>

As described above, in the image data processing application of this embodiment, the determination procedure in the step S20 and the processing procedure in the step S30 are executed. Namely, when the QR code 200 is included in the image data saved in the memory 105, the CPU 102 determines whether the QR code 200 in the image data is divided into a plurality of QR codes through the dividing procedure in the step S15. When the QR code 200 in the image data is divided into the plurality of QR codes, the CPU 102 executes the procedure in the step S30 in which the error correction level of the divided QR codes is made to be higher than that of the original QR code 200. In other words, the CPU 102 changes the QR code 200 into the QR codes 201 having a higher error correction level than the QR code 200. Then, the CPU 102 sequentially outputs the certain pieces of first divided image data including the QR codes 201 having the higher error correction level to the label producing apparatus 1.

As described above, reading failure is inhibited and an information obtaining rate for the QR code is improved by making the error correction level of the QR codes 201 generated by being divided into a plurality of codes in split printing higher. This results in image data that can maintain the reading accuracy of the QR code in split printing, which improves user-friendliness.

Especially in this embodiment, the image data is divided into the allowable area Ap where the arrangement of the QR code 200 is allowed and the prohibition area Ai where the arrangement of the QR code 200 is prohibited. After the error correction level enhancement processing procedure in the step S30, the determination procedure in the step S35 in which it is determined whether the entirety of the QR codes 201 of which error correction level is increased is positioned within the allowable area Ap, is executed by the image data processing application. The output procedure in the step S40 is executed when it is determined in the step S35 that the QR codes 201 are positioned within the allowable area Ap.

Thus, when the image data has an area restriction for the arrangement of the QR code(s), the error correction level of the QR codes 201 is increased to a high value while the area restriction (the QR code(s) can be arranged only in the allowable area Ap) is maintained. Accordingly, the reading failure is inhibited.

Especially in this embodiment, the entire dimension of the QR code(s) may be larger by increasing the error correction level to inhibit the reading failure of the QR code 200 as described above. This may cause the QR code(s) not to be positioned within the allowable area Ap. In the present disclosure, in such a case, the new QR codes 202 that give the substantially same information as the respective QR codes 201, are generated in accordance with the generating procedure in the step S45 without sequentially outputting the QR codes 201 having the higher error correction level. The certain pieces of first divided image data including the QR codes 202 are sequentially output to the label producing apparatus 1 in the output procedure in the step S55.

In the present disclosure, the new QR codes 202 that give the substantially same information as the respective QR codes 201, are generated separately, and the QR codes 202 are printed on the split labels L1 and L2. Reading the QR codes 202 independently reliably obtains the information having contents equivalent to the original QR code 200. This improves user-friendliness.

Especially in this embodiment, the determination procedure in the step S50, in which it is determined whether the entirety of the QR codes 202 is positioned within the allowable area AP, is further executed by the image data processing application. The output procedure in the step S55 is executed when it is determined in the step S50 that the QR codes 202 are positioned within the allowable area Ap.

When the image data has the area restriction for the arrangement of the QR code(s), the QR codes 202 are generated separately while the area restriction (the QR code(s) can be arranged only in the allowable area Ap) is maintained. Accordingly, the information can be obtained reliably.

Especially in this embodiment, the number of QR codes 202 may be large when the method for generating the new QR codes 202 to improve the information obtaining rate for the QR code(s) is adopted. In such a case, the entire dimension of the QR codes 202 is relatively large, and thus the QR codes 202 may not be positioned within the allowable area Ap.

In order to solve the above problem, in the present disclosure, one split label L3 is generated for the original QR code 200 instead of sequentially outputting the QR codes 201 or generating the new QR codes 202. Namely, the output procedure in the step S40 and the output procedure in the step S45 are not executed, and a piece of new QR code image data including the original QR code 200 and having a size that corresponds to the tape width of the printing tape 57 is generated in the step S65.

Normal split printing is performed for any other portions than the QR code 200. Namely, the certain pieces of second divided image data obtained by omitting the QR codes from the certain pieces of first divided image data are generated in the step S60. Then, the certain pieces of second divided image data are sequentially output to the label producing apparatus 1 in the output procedure in the step S70, and the piece of QR code image data generated in the generating procedure in the step S65 is also output to the label producing apparatus 1.

Thus, the user can arrange the certain number of split labels L1 and L2 made using the second divided image data (not including QR code) in the order of production such that the labels L1 and L2 are adjacent to each other. Then the user can overlap the one split label L3 made using the QR code image data (including the QR code) with the labels L1 and L2 such that the label L3 is positioned on the labels L1 and L2. Accordingly, the contents of the original image data can be shown as a whole. As a result, reading can be performed for the one split label L3, and the information of contents of the original QR code 200 can be reliably obtained. This enhances user-friendliness.

In this embodiment, at least one of the certain pieces of second divided image data includes the guide lines 122. The guide lines 122 are mark images for arranging the split label L3, which is produced by the label producing apparatus 1 while corresponding to the piece of QR code image data, on the aggregate of the split labels L1 and L2 produced by the label producing apparatus 1 while corresponding to the certain pieces of second divided image data.

Accordingly, the user can easily perform the correct positioning when the split label L3 including the QR code 200 is arranged on the split labels L1 and L2 after the split labels L1 and L2 not including the QR code are arranged.

The wording "perpendicular (vertical)", "parallel", "flat surface" and the like in the above description are not used strictly. Namely, the wording "perpendicular (vertical)", "parallel", and "flat surface" may include design tolerance and error and manufacturing tolerance and error, and mean "substantially perpendicular (vertical)", "substantially parallel", and "substantially flat surface".

In the above description, the wording "identical to (the same as)", "equal to (equivalent to)", "different from", and the like used to describe the dimension or size of the external appearance are not used strictly. Namely, the wording "identical to (the same as)", "equal to (equivalent to)", and "different from" may include design tolerance and error and manufacturing tolerance and error, and mean "substantially identical to (the same as)", "substantially equal to (equivalent to)", and "substantially different from". However, regarding values functioning as a predefined determination reference or values for separation, such as threshold values (see the flowchart of FIGS. 20A and 20B) and reference values, the wording "identical to (the same as)", "equal to (equivalent to)", "different from" and the like are used strictly.

The arrows indicated in the figures such as FIGS. 4A and 4B are examples of the flowing of the signal(s). The flowing directions of the signal(s) are not limited thereby.

The flowcharts indicated in FIGS. 20A and 20B and the like are not intended to limit the present disclosure to the series of procedures indicated in the flowcharts. The procedure(s) may be added, deleted, or the order thereof may be changed without departing from the gist or scope and the technical concept of the present disclosure.

In addition to those already described above, the approaches described in the above embodiment(s) and the modified example(s) may be used in combination as appropriate.

Although not illustrated by examples, the present disclosure may be implemented with various modifications within a range not departing from the gist thereof.

What is claimed is:

1. A non-transitory computer readable medium storing an image data processing program, the image data processing program being executed by a computer connected to a printer including: a conveyer configured to convey a printing medium; and a printing unit configured to perform printing corresponding to input image data on the printing medium conveyed by the conveyer, wherein the image data processing program causes the computer to:

obtain a width of the printing medium;

obtain a piece of image data that is a printing target and that includes a first two-dimensional code generated by a first error correction level, and save the piece of image data in a memory of the computer;

divide the piece of image data into a plurality of pieces of first divided image data corresponding to the width of the printing medium obtained;

determine whether the first two-dimensional code included in the piece of image data is divided into a plurality of two-dimensional codes;

in a case that it is determined that the first two-dimensional code is divided into the plurality of two-dimensional codes, increase an error correction level of the plurality of divided two-dimensional codes included in the plurality of pieces of first divided image data to a second error correction level higher than the first error correction level; and sequentially output the plurality of pieces of first divided image data to the printing apparatus.

2. The non-transitory computer readable medium according to claim 1, wherein the piece of image data includes a first area where arrangement of the two-dimensional code is allowed and a second area where the arrangement of the two-dimensional code is prohibited, and the image data processing program further causes the computer to:

determine whether an entirety of the plurality of divided two-dimensional codes having the second error correction level is positioned within the first area;

in a case that it is determined that the plurality of divided two-dimensional codes are positioned within the first area, sequentially output the plurality of pieces of first divided image data including the plurality of divided two-dimensional codes having the second error correction level to the printing apparatus.

3. The non-transitory computer readable medium according to claim 2, wherein in a case that it is determined that the plurality of divided two-dimensional codes are not positioned within the first area, while skipping outputting the plurality of pieces of first divided image data sequentially to the printing apparatus, the image data processing program causes the computer to:

newly generate a plurality of second two-dimensional codes giving substantially the same information as the plurality of divided two-dimensional codes;

generate the plurality of pieces of first divided image data including the plurality of second two-dimensional codes instead of the plurality of divided two-dimensional codes; and sequentially output the plurality of pieces of first divided image data including the plurality of second two-dimensional codes to the printing apparatus.

4. The non-transitory computer readable medium according to claim 3, wherein the image data processing program further causes the computer to:

determine whether an entirety of the plurality of second two-dimensional codes is positioned within the first area; and sequentially output the plurality of pieces of first divided image data including the plurality of second two-dimensional codes to the printing apparatus, in a case that it is determined that the plurality of second two-dimensional codes are positioned within the first area.

5. The non-transitory computer readable medium according to claim 4, wherein in a case that it is determined that the plurality of second two-dimensional codes are not positioned within the first area, while skipping outputting the plurality of pieces of first divided image data sequentially to the printing apparatus, the image data processing program causes the computer to:

generate a plurality of pieces of second divided image data in a form in which the plurality of divided two-dimensional codes are omitted from the plurality of pieces of first divided image data, instead of the plurality of pieces of first divided image data including the plurality of second two-dimensional codes;

generate another piece of two-dimensional code image data including the first two-dimensional code and corresponding to the width of the printing medium;

sequentially output the plurality of pieces of second divided image data in the form in which the plurality of divided two-dimensional codes are omitted from the plurality of pieces of first divided image data, to the printing apparatus, and output the another piece of two-dimensional code image data to the printing apparatus.

6. The non-transitory computer readable medium according to claim 5, wherein at least one of the plurality of pieces of second divided image data includes a mark image that allows a second printing matter to be produced by the printing apparatus while corresponding to the piece of two-dimensional code image data to be arranged on a first printing matter to be produced by the printing apparatus while corresponding to the plurality of pieces of second divided image data.

* * * * *